United States Patent
Kim et al.

(10) Patent No.: US 12,170,917 B2
(45) Date of Patent: Dec. 17, 2024

(54) DISCONTINUOUS DOWNLINK CHANNEL MONITORING

(71) Applicant: QUALCOMM Incorporated, San Diego, CA (US)

(72) Inventors: Yuchul Kim, San Diego, CA (US); Huilin Xu, Temecula, CA (US); Hwan Joon Kwon, San Diego, CA (US); Peter Pui Lok Ang, San Diego, CA (US); Jay Kumar Sundararajan, San Diego, CA (US); Krishna Kiran Mukkavilli, San Diego, CA (US); Yeliz Tokgoz, San Diego, CA (US); Jing Lei, San Diego, CA (US); Tingfang Ji, San Diego, CA (US); Ravi Agarwal, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/512,740

(22) Filed: Nov. 17, 2023

(65) Prior Publication Data

US 2024/0089766 A1    Mar. 14, 2024

Related U.S. Application Data

(62) Division of application No. 17/231,281, filed on Apr. 15, 2021, now Pat. No. 11,871,255.

(Continued)

(51) Int. Cl.
*H04W 72/23* (2023.01)
*H04L 1/08* (2006.01)
(Continued)

(52) U.S. Cl.
CPC ............... *H04W 24/08* (2013.01); *H04L 1/08* (2013.01); *H04L 1/1614* (2013.01); *H04W 72/23* (2023.01); *H04W 72/51* (2023.01)

(58) Field of Classification Search
CPC ..... H04W 72/51; H04W 72/23; H04W 24/08; H03L 1/08; H03L 1/1614
See application file for complete search history.

(56) References Cited

U.S. PATENT DOCUMENTS

2020/0029315 A1    1/2020 Lin et al.
2020/0245395 A1*   7/2020 Zhang .................. H04W 76/19
(Continued)

FOREIGN PATENT DOCUMENTS

CN    109842937 A    6/2019
EP    3726904 A1     10/2020
(Continued)

OTHER PUBLICATIONS

International Preliminary Report On Patentability—PCT/US2021/027660—The International Bureau of WIPO—Geneva, Switzerland—Dec. 1, 2022.

(Continued)

*Primary Examiner* — Kent Krueger
(74) *Attorney, Agent, or Firm* — Guang Yu Zhang; Holland & Hart LLP

(57) ABSTRACT

Methods, systems, and devices for wireless communications are described. A communication device, otherwise known as a user equipment (UE) may transmit capability information including an indication of a discontinuous monitoring delay period. The UE may receive a message including an indication to adjust monitoring of a physical downlink control channel (PDCCH), and monitor for the PDCCH during the discontinuous monitoring delay period. The UE may adjust monitoring for the PDCCH following the discontinuous (Continued)

monitoring delay period during a temporal period based on the received indication to adjust monitoring of the PDCCH. In some examples, at least one of physical downlink shared channel (PDSCH) reception, downlink reference signal monitoring, uplink reference signal transmissions, and channel reporting is enabled during the temporal period while monitoring of the PDCCH is adjusted.

30 Claims, 20 Drawing Sheets

Related U.S. Application Data

(60) Provisional application No. 63/026,516, filed on May 18, 2020.

(51) Int. Cl.
*H04L 1/1607* (2023.01)
*H04W 24/08* (2009.01)
*H04W 72/51* (2023.01)

(56) References Cited

U.S. PATENT DOCUMENTS

| | | |
|---|---|---|
| 2020/0267655 A1 | 8/2020 | Awoniyi-Oteri et al. |
| 2020/0404669 A1 | 12/2020 | Seo et al. |
| 2021/0360448 A1 | 11/2021 | Kim et al. |
| 2022/0039009 A1 | 2/2022 | Iyer et al. |
| 2022/0132341 A1 | 4/2022 | Lee et al. |
| 2022/0191793 A1 | 6/2022 | Murray et al. |
| 2022/0201522 A1* | 6/2022 | Tao ................. H04L 5/0053 |
| 2022/0217635 A1* | 7/2022 | Lee ............... H04W 72/0446 |
| 2022/0240187 A1 | 7/2022 | Guo et al. |
| 2022/0361013 A1 | 11/2022 | Cai et al. |

FOREIGN PATENT DOCUMENTS

| | | |
|---|---|---|
| WO | 2019099880 A1 | 5/2019 |
| WO | WO-2019139300 A1 | 7/2019 |
| WO | WO-2020032774 A1 | 2/2020 |

OTHER PUBLICATIONS

International Search Report and Written Opinion—PCT/US2021/027660—ISA/EPO—Sep. 9, 2021.
Partial International Search Report—PCT/US2021/027660—ISA/EPO—Jul. 19, 2021.

* cited by examiner

DISCONTINUOUS DOWNLINK CHANNEL MONITORING

CROSS REFERENCE

The present application for patent is a Divisional of U.S. patent application Ser. No. 17/231,281 by KIM et al., entitled "DISCONTINUOUS DOWNLINK CHANNEL MONITORING" filed Apr. 15, 2021, which claims the benefit of U.S. Provisional Patent Application No. 63/026,516 by KIM et al., entitled "DISCONTINUOUS DOWNLINK CHANNEL MONITORING," filed May 18, 2020, each of which are assigned to the assignee hereof, and each of which are expressly incorporated by reference herein.

FIELD OF TECHNOLOGY

The following relates generally to wireless communications, and more specifically to discontinuous downlink channel monitoring for wireless communications in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the described techniques relate to configuring a communication device, which may be otherwise known as a user equipment (UE) to support discontinuous downlink channel monitoring during a temporal period. The UE may be configured to receive a message, such as a radio resource control (RRC) message or a downlink control information (DCI) message that may include an indication to adjust (e.g., disable) monitoring of a downlink channel, for example, a physical downlink control channel (PDCCH) during a temporal period. The PDCCH may schedule a physical downlink shared channel (PDSCH) carrying a transport block or a burst of transport blocks carrying data traffic. In some examples, the UE may be configured to monitor for the downlink channel during a discontinuous monitoring delay period, which may be a duration between a time associated with the received message and a time associated with disabling monitoring of the downlink channel. The UE may thereby be configured to disable monitoring of the PDCCH following the delay period.

Additionally or alternatively, the UE may be configured to reduce a retransmission timer, for example, based on a timing of a last transport block associated with a downlink channel and with respective to a beginning of an inactive period for the UE. The UE may monitor for a PDCCH scheduling a PDSCH carrying a retransmission of the last transport block based on the reduced retransmission timer, and enter a sleep mode in response to the monitoring or based on the reduced retransmission timer and the inactive period for the UE. The UE may thereby experience power saving by disabling monitoring of PDCCH during temporal period, but still maintain other wireless operations (e.g., PDSCH reception, channel reporting, uplink reference signal transmissions, etc.) during the temporal period. The UE may also experience reduced power consumption by operating according to a reduced retransmission timer. The described techniques may, as a result, also include features for improvements to wireless communications and, in some examples, may promote high reliability and low latency wireless communications, among other benefits.

A method of wireless communications at a UE is described. The method may include transmitting capability information including an indication of a discontinuous monitoring delay period, receiving a message including an indication to adjust monitoring of a PDCCH, monitoring for the PDCCH during the discontinuous monitoring delay period, and adjusting monitoring for the PDCCH following the discontinuous monitoring delay period during a temporal period based on the received indication to adjust monitoring of the PDCCH, where at least one of PDSCH reception, downlink reference signal monitoring, uplink reference signal transmissions, and channel reporting is enabled during the temporal period while monitoring of the PDCCH is adjusted.

An apparatus for wireless communications is described. The apparatus may include a processor, memory coupled with the processor, and instructions stored in the memory. The instructions may be executable by the processor to cause the apparatus to transmit capability information including an indication of a discontinuous monitoring delay period, receive a message including an indication to adjust monitoring of a PDCCH, monitor for the PDCCH during the discontinuous monitoring delay period, and adjust monitoring for the PDCCH following the discontinuous monitoring delay period during a temporal period based on the received indication to adjust monitoring of the PDCCH, where at least one of PDSCH reception, downlink reference signal monitoring, uplink reference signal transmissions, and channel reporting is enabled during the temporal period while monitoring of the PDCCH is adjusted.

Another apparatus for wireless communications is described. The apparatus may include means for transmitting capability information including an indication of a discontinuous monitoring delay period, receiving a message including an indication to adjust monitoring of a PDCCH, monitoring for the PDCCH during the discontinuous monitoring delay period, and adjusting monitoring for the PDCCH following the discontinuous monitoring delay period during a temporal period based on the received indication to adjust monitoring of the PDCCH, where at least one of PDSCH reception, downlink reference signal monitoring, uplink reference signal transmissions, and channel reporting is enabled during the temporal period while monitoring of the PDCCH is adjusted.

A non-transitory computer-readable medium storing code for wireless communications at a UE is described. The code may include instructions executable by a processor to transmit capability information including an indication of a discontinuous monitoring delay period, receive a message including an indication to adjust monitoring of a PDCCH, monitor for the PDCCH during the discontinuous monitoring delay period, and adjust monitoring for the PDCCH following the discontinuous monitoring delay period during a temporal period based on the received indication to adjust monitoring of the PDCCH, where at least one of PDSCH reception, downlink reference signal monitoring, uplink reference signal transmissions, and channel reporting is enabled during the temporal period while monitoring of the PDCCH is adjusted.

In some examples of the method, apparatuses, and non-transitory computer-readable medium described herein, the discontinuous monitoring delay period includes a duration between a first time associated with the received message and a second time associated with adjusting the monitoring of the PDCCH during an active portion of a discontinuous reception (DRX) cycle.

In some examples of the method, apparatuses, and non-transitory computer-readable medium described herein, receiving the message may include operations, features, means, or instructions for receiving the indication to adjust monitoring of the PDCCH prior to the first transport block of a burst of transport blocks within an active portion of a DRX cycle.

In some examples of the method, apparatuses, and non-transitory computer-readable medium described herein, monitoring for the PDCCH during the discontinuous monitoring delay period may include operations, features, means, or instructions for performing blind decoding on the PDCCH until the delay period lapses.

Some examples of the method, apparatuses, and non-transitory computer-readable medium described herein may further include operations, features, means, or instructions for receiving the message corresponds to a decoding delay period.

In some examples of the method, apparatuses, and non-transitory computer-readable medium described herein, the discontinuous monitoring delay period may be greater than or equal to the decoding delay period.

Some examples of the method, apparatuses, and non-transitory computer-readable medium described herein may further include operations, features, means, or instructions for refraining from performing blind decoding on the PDCCH in response to the discontinuous monitoring delay period lapsing.

In some examples of the method, apparatuses, and non-transitory computer-readable medium described herein, the message includes an RRC message or a DCI message carried in the PDCCH.

A method of wireless communications at a base station is described. The method may include receiving capability information including an indication of a discontinuous monitoring delay period, transmitting a message including an indication to adjust monitoring of a PDCCH during a temporal period in which at least one of PDSCH reception, downlink reference signal monitoring, uplink reference signal transmissions, and channel reporting is enabled during the temporal period while monitoring of the PDCCH is adjusted, and transmitting the PDCCH during the discontinuous monitoring delay period.

An apparatus for wireless communications is described. The apparatus may include a processor, memory coupled with the processor, and instructions stored in the memory. The instructions may be executable by the processor to cause the apparatus to receive capability information including an indication of a discontinuous monitoring delay period, transmit a message including an indication to adjust monitoring of a PDCCH during a temporal period in which at least one of PDSCH reception, downlink reference signal monitoring, uplink reference signal transmissions, and channel reporting is enabled during the temporal period while monitoring of the PDCCH is adjusted, and transmit the PDCCH during the discontinuous monitoring delay period.

Another apparatus for wireless communications is described. The apparatus may include means for receiving capability information including an indication of a discontinuous monitoring delay period, transmitting a message including an indication to adjust monitoring of a PDCCH during a temporal period in which at least one of PDSCH reception, downlink reference signal monitoring, uplink reference signal transmissions, and channel reporting is enabled during the temporal period while monitoring of the PDCCH is adjusted, and transmitting the PDCCH during the discontinuous monitoring delay period.

A non-transitory computer-readable medium storing code for wireless communications at a base station is described. The code may include instructions executable by a processor to receive capability information including an indication of a discontinuous monitoring delay period, transmit a message including an indication to adjust monitoring of a PDCCH during a temporal period in which at least one of PDSCH reception, downlink reference signal monitoring, uplink reference signal transmissions, and channel reporting is enabled during the temporal period while monitoring of the PDCCH is adjusted, and transmit the PDCCH during the discontinuous monitoring delay period.

In some examples of the method, apparatuses, and non-transitory computer-readable medium described herein, the discontinuous monitoring delay period includes a duration between a first time associated with reception of the transmitted message by the UE and a second time associated with adjusting the monitoring of the PDCCH by the UE.

In some examples of the method, apparatuses, and non-transitory computer-readable medium described herein, transmitting the message may include operations, features, means, or instructions for transmitting the indication to adjust monitoring of the PDCCH prior to the first transport block of a burst of transport blocks within an active portion of a DRX cycle.

In some examples of the method, apparatuses, and non-transitory computer-readable medium described herein, the message includes an RRC message or a DCI message carried in the PDCCH.

A method of wireless communications at a UE is described. The method may include transmitting acknowledgment feedback for a last transport block of a burst of transport blocks, reducing a retransmission timer at the UE based on a timing of the last transport block with respect to a beginning of an inactive period for the UE, monitoring for a PDCCH based on the reduced retransmission timer, and entering a sleep mode based on the monitoring, the reduced retransmission timer, and the inactive period for the UE.

An apparatus for wireless communications is described. The apparatus may include a processor, memory coupled with the processor, and instructions stored in the memory. The instructions may be executable by the processor to cause the apparatus to transmit acknowledgment feedback for a last transport block of a burst of transport blocks, reduce a retransmission timer at the apparatus based on a timing of the last transport block with respect to a beginning of an inactive period for the apparatus, monitor for a PDCCH based on the reduced retransmission timer, and enter a sleep mode based on the monitoring, the reduced retransmission timer, and the inactive period for the apparatus.

Another apparatus for wireless communications is described. The apparatus may include means for transmitting acknowledgment feedback for a last transport block of a burst of transport blocks, reducing a retransmission timer at the apparatus based on a timing of the last transport block with respect to a beginning of an inactive period for the apparatus, monitoring for a PDCCH based on the reduced retransmission timer, and entering a sleep mode based on the monitoring, the reduced retransmission timer, and the inactive period for the apparatus.

A non-transitory computer-readable medium storing code for wireless communications at a UE is described. The code may include instructions executable by a processor to transmit acknowledgment feedback for a last transport block of a burst of transport blocks, reduce a retransmission timer at the UE based on a timing of the last transport block with respect to a beginning of an inactive period for the UE, monitor for a PDCCH based on the reduced retransmission timer, and enter a sleep mode based on the monitoring, the reduced retransmission timer, and the inactive period for the UE.

Some examples of the method, apparatuses, and non-transitory computer-readable medium described herein may further include operations, features, means, or instructions for enabling the reduced retransmission timer over a DRX cycle.

Some examples of the method, apparatuses, and non-transitory computer-readable medium described herein may further include operations, features, means, or instructions for receiving a message including an indication of a value of the retransmission timer, where reducing the retransmission timer may be based on the value of the retransmission timer in the received message.

Some examples of the method, apparatuses, and non-transitory computer-readable medium described herein may further include operations, features, means, or instructions for removing an offset from the value of the retransmission timer based on the received message, where reducing the retransmission timer may be based on removing the offset from the value of the retransmission timer.

Some examples of the method, apparatuses, and non-transitory computer-readable medium described herein may further include operations, features, means, or instructions for applying a scaling factor to the value of the retransmission timer based on the received message, where reducing the retransmission timer may be based on applying the scaling factor to the value of the retransmission timer.

In some examples of the method, apparatuses, and non-transitory computer-readable medium described herein, the message includes an RRC message.

In some examples of the method, apparatuses, and non-transitory computer-readable medium described herein, the message includes a downlink control information message scheduling a PDSCH carrying the last transport block of the burst of transport blocks.

Some examples of the method, apparatuses, and non-transitory computer-readable medium described herein may further include operations, features, means, or instructions for monitoring the PDCCH while the retransmission timer may be running.

Some examples of the method, apparatuses, and non-transitory computer-readable medium described herein may further include operations, features, means, or instructions for receiving a message including a bitmap identifying a set of candidate durations for monitoring the PDCCH for candidate retransmissions of the last transport block of the burst of transport blocks, where reducing the retransmission timer may be based on the bitmap in the received message.

In some examples of the method, apparatuses, and non-transitory computer-readable medium described herein, monitoring the PDCCH may include operations, features, means, or instructions for monitoring for the PDCCH to receive the last transport block during a portion of a duration associated with the reduced retransmission timer.

Some examples of the method, apparatuses, and non-transitory computer-readable medium described herein may further include operations, features, means, or instructions for receiving a second PDCCH scheduling a retransmission of the last transport block of the burst of transport blocks during a portion of a duration associated with the reduced retransmission timer, and receiving the retransmission of the last transport block of the burst of transport blocks.

In some examples of the method, apparatuses, and non-transitory computer-readable medium described herein, the portion may be based on a relationship between a first time associated with the PDCCH scheduling the transmission of the last transport block and a second time of a transmission of the last transport block or a third time of the transmitted acknowledgment feedback for the last transport block.

In some examples of the method, apparatuses, and non-transitory computer-readable medium described herein, transmitting the acknowledgement feedback may include operations, features, means, or instructions for transmitting a hybrid automatic repeat request feedback message based on receiving the burst of transport blocks during an active portion of a DRX cycle, and deactivating the reduced retransmission timer based on transmitting the hybrid automatic repeat request feedback message.

In some examples of the method, apparatuses, and non-transitory computer-readable medium described herein, transmitting the acknowledgement feedback may include operations, features, means, or instructions for transmitting a positive hybrid automatic repeat request feedback message based on receiving a retransmission of the last transport block of the burst of transport blocks during a portion of a duration associated with the reduced retransmission timer, and deactivating the reduced retransmission timer based on transmitting the hybrid automatic repeat request feedback message.

Some examples of the method, apparatuses, and non-transitory computer-readable medium described herein may further include operations, features, means, or instructions for receiving a message including an indication to deactivate a group of search space sets associated with an active portion of a DRX cycle based on a grant for the last transport block of the burst of transport blocks, and deactivating the group of search space sets based on the received message.

In some examples of the method, apparatuses, and non-transitory computer-readable medium described herein, transmitting the acknowledgement feedback may include operations, features, means, or instructions for transmitting a negative hybrid automatic repeat request feedback message for the last transport block of the burst of transport blocks based on the UE failing to receive the last transport block of the burst of transport blocks, and activating a group of search space sets associated with retransmission of the last transport block of the burst of transport blocks based on the transmitted negative hybrid automatic repeat request feedback message, where the group of search space sets corresponds to an active portion of a DRX cycle.

A method of wireless communications at a base station is described. The method may include transmitting a last transport block of a burst of transport blocks to a UE, receiving acknowledgment feedback for the last transport block of the burst of transport blocks, and retransmitting the last transport block scheduled by a PDCCH during a portion of a duration associated with a reduced retransmission timer, where the reduced retransmission timer is based on a timing of the last transport block with respect to a beginning of an inactive period for the UE.

An apparatus for wireless communications is described. The apparatus may include a processor, memory coupled with the processor, and instructions stored in the memory. The instructions may be executable by the processor to cause the apparatus to transmit a last transport block of a burst of transport blocks to a UE, receive acknowledgment feedback for the last transport block of the burst of transport blocks, and retransmit the last transport block scheduled by a PDCCH during a portion of a duration associated with a reduced retransmission timer, where the reduced retransmission timer is based on a timing of the last transport block with respect to a beginning of an inactive period for the UE.

Another apparatus for wireless communications is described. The apparatus may include means for transmitting a last transport block of a burst of transport blocks to a UE, receiving acknowledgment feedback for the last transport block of the burst of transport blocks, and retransmitting the last transport block scheduled by a PDCCH during a portion of a duration associated with a reduced retransmission timer, where the reduced retransmission timer is based on a timing of the last transport block with respect to a beginning of an inactive period for the UE.

A non-transitory computer-readable medium storing code for wireless communications at a base station is described. The code may include instructions executable by a processor to transmit a last transport block of a burst of transport blocks to a UE, receive acknowledgment feedback for the last transport block of the burst of transport blocks, and retransmit the last transport block scheduled by a PDCCH during a portion of a duration associated with a reduced retransmission timer, where the reduced retransmission timer is based on a timing of the last transport block with respect to a beginning of an inactive period for the UE.

Some examples of the method, apparatuses, and non-transitory computer-readable medium described herein may further include operations, features, means, or instructions for transmitting a message including an indication of a value of the retransmission timer.

In some examples of the method, apparatuses, and non-transitory computer-readable medium described herein, the message includes a downlink control information message scheduling the PDCCH carrying the last transport block of the burst of transport blocks.

In some examples of the method, apparatuses, and non-transitory computer-readable medium described herein, the message includes an RRC message.

Some examples of the method, apparatuses, and non-transitory computer-readable medium described herein may further include operations, features, means, or instructions for transmitting a message including a bitmap identifying a set of candidate durations for PDCCH scheduling candidate retransmissions of the last transport block of the burst of transport blocks.

In some examples of the method, apparatuses, and non-transitory computer-readable medium described herein, transmitting a second PDCCH scheduling a retransmission of the last transport block of the burst of transport blocks during a portion of a duration associated with the reduced retransmission timer, where retransmitting the last transport block may include operations, features, means, or instructions for transmitting the retransmission of the last transport block of the burst of transport blocks.

In some examples of the method, apparatuses, and non-transitory computer-readable medium described herein, the portion may be based on a relationship between a first time associated with the transmitting PDCCH scheduling the transmission of the last transport block and a second time of a transmission of the last transport block or a third time of the transmitted acknowledgment feedback for the last transport block by the UE.

In some examples of the method, apparatuses, and non-transitory computer-readable medium described herein, receiving acknowledgment feedback may include operations, features, means, or instructions for receiving a hybrid automatic repeat request feedback message based on retransmitting the last transport block during an active portion of a DRX cycle.

Some examples of the method, apparatuses, and non-transitory computer-readable medium described herein may further include operations, features, means, or instructions for allocating a grant for the last transport block of the burst of transport blocks, and transmitting a message including an indication to deactivate a group of search space sets associated with an active portion of a DRX cycle based on the grant for the last transport block of the burst of transport blocks.

DETAILED DESCRIPTION

Figure 1:
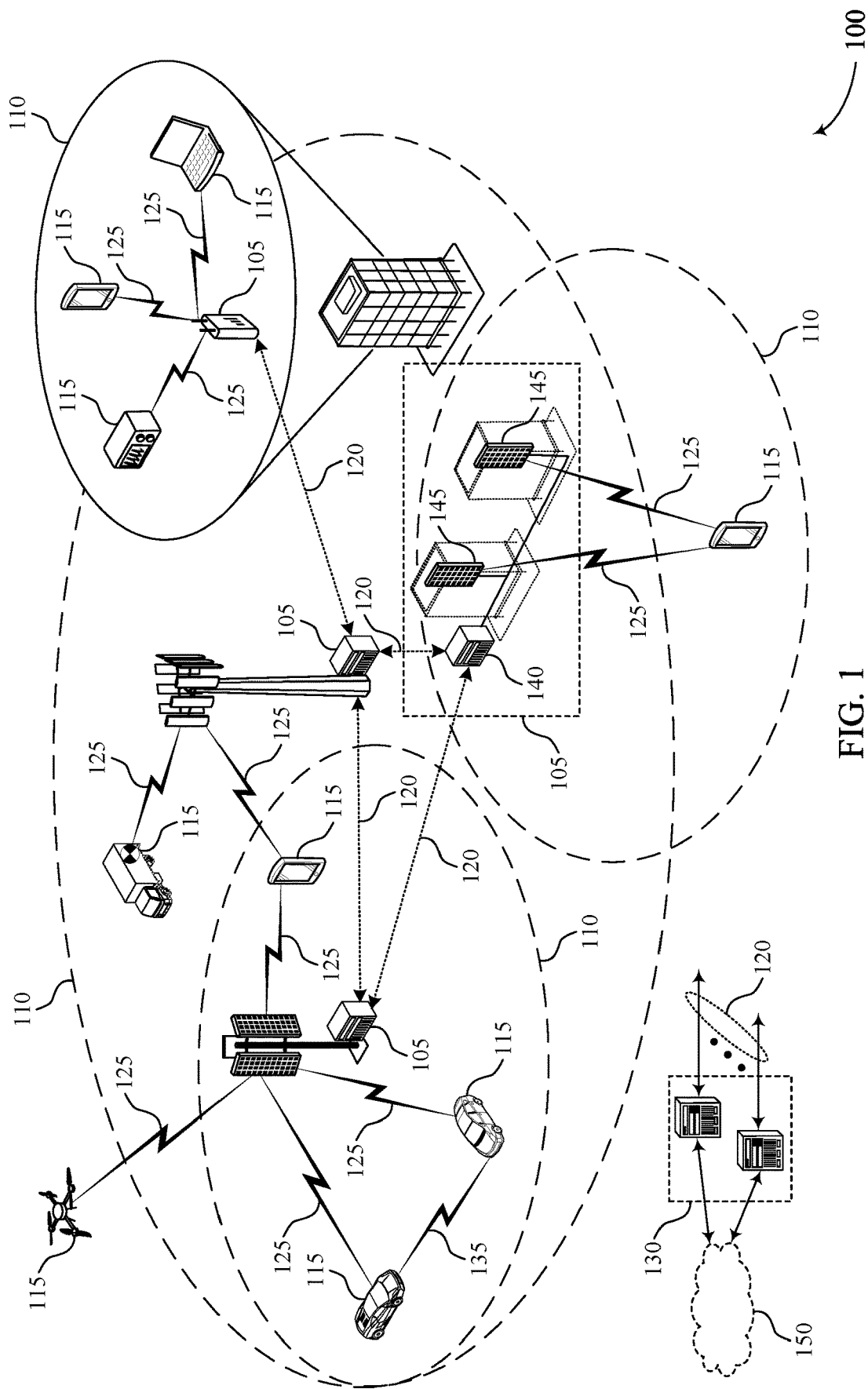
FIGS. 1 and 2 illustrate examples of wireless communications systems in accordance with aspects of the present disclosure.

Some wireless communication systems may include communication devices, such as user equipment (UE) and base stations, for example, eNodeBs (eNBs), next-generation NodeBs or giga-NodeBs (either of which may be referred to as a gNB) that may support multiple radio access technologies. Examples of radio access technologies include 4G systems such as Long-Term Evolution (LTE) systems and fifth generation (5G) systems which may be referred to as New Radio (NR) systems. A UE may support various types of applications that may have periodic or semi-periodic data traffic. The applications may be hosted by a server as described herein. The server may transmit the periodic or semi-periodic data traffic to a base station, which may forward the data traffic to the UE. The server may divide the data traffic into multiple slices (also referred to as files) and encode each slice separately, and transmit the encoded slices to the base station, which may forward the data traffic to the UE using multiple transport blocks (also referred to as a burst of transport blocks). Each burst of transport blocks may have a transmission delay.

The UE may benefit from the periodic or semi-periodic data traffic and the transmission delay between bursts of transport blocks carrying the periodic or semi-periodic data traffic to implement various operations to reduce power consumption. The UE may support connected mode discontinuous reception (CDRX) operations in which the UE may enter an active state (e.g., power-up during active portions (also referred to as ON durations) of a discontinuous reception (DRX) cycle) to monitor a downlink channel (e.g., a physical downlink control channel (PDCCH)) to receive the periodic or semi-periodic data traffic, as well as to enter an inactive state (e.g., power-down during inactive portions (also referred to as OFF durations) of a DRX cycle) and stop monitoring of the downlink channel (e.g., the PDCCH). The PDCCH may schedule a physical downlink shared channel (PDSCH) carrying a transport block or a burst of transport blocks carrying data traffic. Although CDRX operations provide power savings for the UE, there may be conditions where CDRX operations may provide shortcomings for power savings for periodic or semi-periodic data traffic. For instance, an inactivity timer associated with CDRX operations may prevent the UE from entering an inactive state or may trigger the UEs to prematurely enter the inactive state, and thereby may have adverse effects on reception of the periodic or semi-periodic data traffic from the base station.

Various aspects of the described techniques relate to configuring the UE to provide power saving improvements by disabling monitoring of one or more downlink channels, for example discontinuous monitoring of a PDCCH when operating in an active state. The UE may disable monitoring a PDCCH during a temporal period while still performing other wireless communication operations during the temporal period, such as downlink reference signal monitoring, uplink reference signal transmissions, and channel reporting. The UE may be configured to receive a message, such as a radio resource control (RRC) message or a downlink control information (DCI) message that may include an indication to disable monitoring of downlink channels, for example, a PDCCH during a temporal period. The UE may be configured to monitor for the downlink channel during a discontinuous monitoring delay period, which may be a duration between a time associated with the received message and a time associated with disabling monitoring of the downlink channels. The UE may thereby be configured to disable monitoring of the downlink channels following the delay period.

Additionally or alternatively, the UE may be configured to reduce a retransmission timer, for example, based on a timing of a last transport block associated with a downlink channel and with respective to a beginning of an inactive period for the UE. The UE may monitor for a downlink channel (e.g., a PDSCH) carrying a retransmission of the last transport block based on the reduced retransmission timer, and enter a sleep mode in response to the monitoring or based on the reduced retransmission timer and the inactive period for the UE. The UE may thereby experience power saving by disabling monitoring of PDCCH during a temporal period, but still maintain other wireless operations (e.g., channel reporting, uplink reference signal transmissions, etc.) during the temporal period. The UE may also experience reduced power consumption by operating according to a reduced retransmission timer.

Aspects of the subject matter described in this disclosure may be implemented to realize one or more of the following potential improvements, among others. The techniques employed by the UEs may provide benefits and enhancements to the operation of the UEs. For example, operations performed by the UEs may provide power saving improvements to the UE. In some examples, configuring the UEs to disable monitoring of PDCCH during a temporal period following a delay period may reduce power consumption by the UEs. In some other examples, configuring the UEs to disable monitoring of a PDCCH during the temporal period according to a reduced retransmission timer may promote low latency wireless communications, among other benefits.

Aspects of the disclosure are initially described in the context of wireless communications systems. Aspects of the disclosure are further illustrated by and described with reference to apparatus diagrams, system diagrams, and flowcharts that relate to discontinuous downlink channel monitoring.

FIG. 1 illustrates an example of a wireless communications system in accordance with aspects of the present disclosure. The wireless communications system 100 may include one or more base stations 105, one or more UEs 115, and a core network 130. In some examples, the wireless communications system 100 may be LTE network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Various aspects of the described techniques relate to configuring the UEs 115 to support discontinuous downlink channel monitoring during a temporal period. The UEs 115 may be configured to receive a message, such as an RRC message or a DCI message that may include an indication to disable monitoring of a downlink channel, for example, a PDCCH during a temporal period. The PDCCH may schedule a PDSCH carrying a transport block or a burst of transport blocks carrying data traffic. In some examples, the UEs 115 may be configured to monitor for the downlink channel during a discontinuous monitoring delay period, which may be a duration between a time associated with the received message and a time associated with disabling monitoring of the downlink channel. The UEs 115 may thereby be configured to disable monitoring of the downlink channel following the delay period.

Additionally or alternatively, the UEs 115 may be configured to reduce a retransmission timer, for example, based on a timing of a last transport block associated with a downlink channel and with respective to a beginning of an inactive period for the UEs 115. The UEs 115 may monitor for a PDCCH that schedule a PDSCH carrying a retransmission of the last transport block based on the reduced retransmission timer, and enter a sleep mode in response to the monitoring or based on the reduced retransmission timer and the inactive period for the UEs 115. The UEs 115 may thereby experience power saving by disabling monitoring of PDCCH during temporal period, but still maintain other wireless operations (e.g., PDSCH reception, channel reporting, uplink reference signal transmissions, etc.) during the temporal period. The UEs 115 may also experience reduced power consumption by operating according to a reduced retransmission timer. The described techniques may, as a result, also include features for improvements to wireless communications and, in some examples, may promote high reliability and low latency wireless communications, among other benefits Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
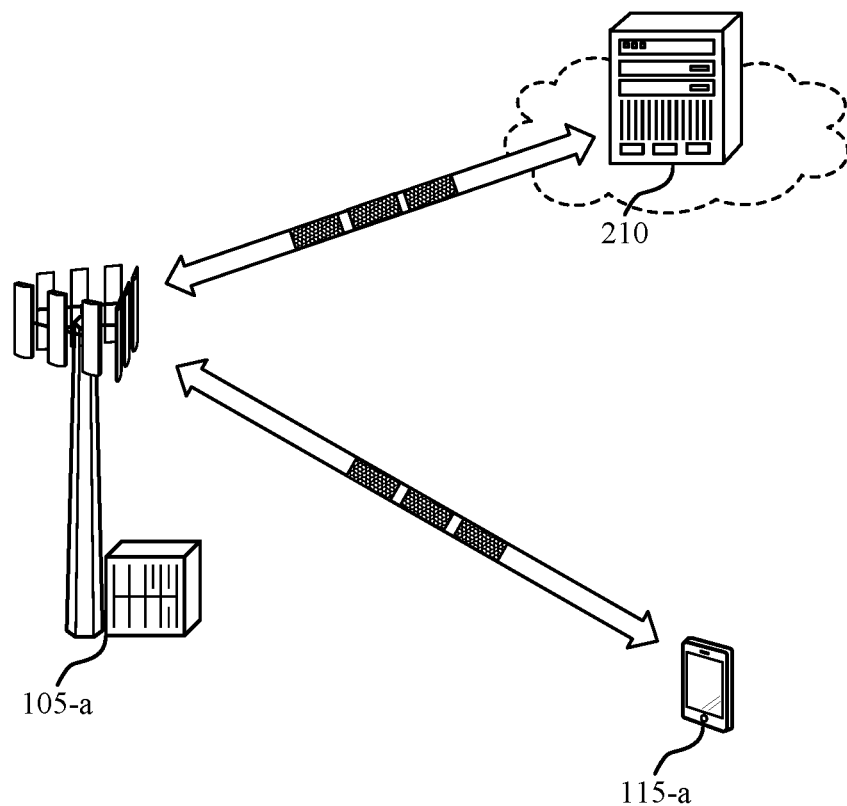

FIG. 2 illustrates an example of a wireless communications system 200 in accordance with aspects of the present disclosure. The wireless communications system 200 may implement aspects of the wireless communications system 100. For example, the wireless communications system 200 may include a base station 105-a and a UE 115-a, which may be examples of a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems. The wireless communications system 200 may include features for improvements to power savings and, in some examples, may promote high reliability and low latency wireless communications, among other benefits.

The base station 105-a and the UE 115-a may support various types of applications that may have periodic or semi-periodic data traffic 205. The base station 105-a may be in wireless communication with a server 210, which may provide the periodic or semi-periodic data traffic 205 to the base station 105-a to forward to the UE 115-a. The server 210 may be a cloud server, a server associated with an application subscription provider, proxy server, web server, application server, or any combination thereof. The server 210 may include an application distribution platform. The application distribution platform may allow the UE 115-a to discover, browse, share, and download applications via the base station 105-a, and therefore provide a digital distribution of the application from the application distribution platform. As such, a digital distribution may be a form of delivering content such as data, without the use of physical media but over online delivery mediums, such as the Internet. For example, the UE 115-a may upload or download applications for streaming, downloading, uploading, or processing, data (e.g., images, audio, video). The server 210 may also transmit to the UE 115-a a variety of information, such as instructions or commands to download applications on the UE 115-a via the base station 105-a.

By way of example, the base station 105-a and the UE 115-a may support mixed reality (XR) applications, which may have periodic or semi-periodic XR data traffic. An XR application may support various frame rates, for example 60 MHz frame rates or 120 MHz frame rates. The server 210 may generate an XR frame at 60 MHz, which may correspond to a periodicity of 16.67 ms. Alternatively, the server 210 may generate an XR frame at 120 MHz, which may correspond to a periodicity of 8.33 ms. The server 210 may transmit the periodic or semi-periodic XR data traffic to the base station 105-a, which may forward the XR data traffic to the UE 115-a. The server 210 may divide the XR data traffic into multiple slices (also referred to as files) and encode each slice separately, and transmit the encoded slices to the base station 105-a, which may forward the XR data traffic to the UE 115-a using multiple transport blocks (also referred to as a burst of transport blocks). There may be, in some examples, a transmission delay between each burst of transport blocks.

The UE 115-a may benefit from the periodic or semi-periodic data traffic 205, as well as the transmission delay between bursts of transport blocks carrying the periodic or semi-periodic data traffic 205 to implement various operations to reduce power consumption. For example, the UE 115-a may support CDRX operations in which the UE 115-a may enter an active state (e.g., power-up) to monitor downlink channels (e.g., a PDCCH) to receive the periodic or semi-periodic data traffic 205, as well as to enter an inactive state (e.g., power-down) and stop monitoring of the downlink channels (e.g., a PDCCH). Although CDRX operations provide power savings for the UE 115-a, there may be conditions where CDRX operations may provide shortcomings for power savings for the UE 115-a. For instance, an inactivity timer associated with CDRX operations may prevent the UE 115-a from entering an inactive state or may trigger the UE 115-a to prematurely enter the inactive state, and thereby may have undesirable effects on reception of the periodic or semi-periodic data traffic 205.

The UE 115-a may provide improvements to power saving by enabling discontinuous monitoring of downlink channels, for example disabling monitoring of downlink channels when operating in an active state. The UE 115-a may disable monitoring downlink channels during a temporal period while still continuing to perform other wireless communication operations, such as downlink reference signal monitoring, uplink reference signal transmissions, and channel reporting during the temporal period. In some examples, the temporal period may be an active portion of a DRX cycle. Here, the UE 115-a may disable monitoring downlink channels (e.g., a PDCCH) during the active portion of the DRX cycle, but may still continue to provide other wireless communication operations, such as downlink reference signal monitoring, uplink reference signal transmissions, and channel reporting during the active portion.

The UE 115-a may disable monitoring of downlink channels, for example PDCCH when CDRX operation is disabled or enabled. In some examples, when the CDRX operation disabled, the UE 115-a disables monitoring of downlink channels, which reduces power consumption for the UE 115-a. In some other examples, when the CDRX operation is enabled, the UE 115-a may disable monitoring of downlink channels prior to an inactivity timer (e.g., a DRX inactivity timer) expiring. The UE 115-a may enable or disable the monitoring of downlink channels autonomously or based on a received indication (also referred to as a discontinuous PDCCH monitoring indication (DPMI)) from the base station 105-a. A DPMI may be associated with one or multiple types of DPMI.

In some examples, a first DPMI type may enable the UE 115-a to disable monitoring of downlink channels until a next active portion of a DRX cycle or for a predetermined duration. In some other examples, a second DPMI type may enable the UE 115-a to disable monitoring of downlink channels exclusively when a retransmission timer is not running and the UE 115-a expect a retransmission from the base station 105-a. In some examples, the UE 115-a may enable or disable the monitoring of downlink channels based at least in part on a field in a scheduling DCI message for downlink data transmissions or uplink data transmission. The field may indicate to the UE 115-a to disable or enable monitoring of downlink channels, as well as a type associated with a DPMI or a duration for disabling the monitoring of downlink channels. The UE 115-a may thereby experience added power savings. The UE 115-a may be further configured to experience added power savings based at least in part on a discontinuous monitoring delay period, a reduced retransmission timer, or activating and deactivating search space sets, or a combination thereof.

Figure 3:
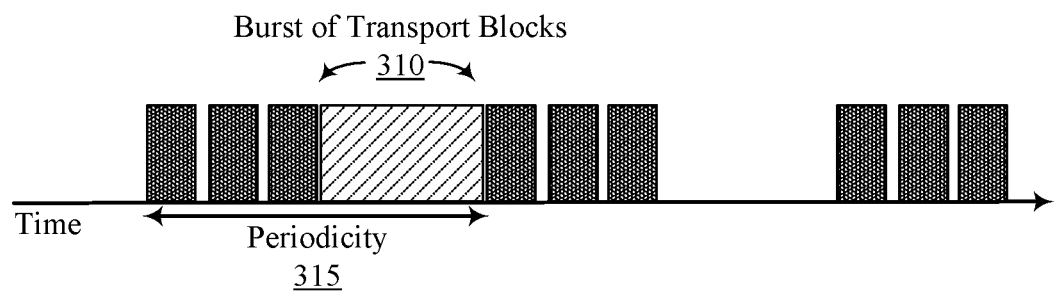
FIGS. 3 and 4 illustrate examples of timelines in accordance with aspects of the present disclosure.
Figure 3:
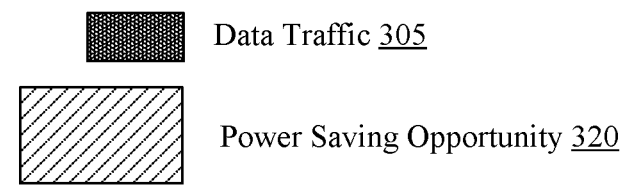

FIG. 3 illustrates an example of a timeline 300 in accordance with aspects of the present disclosure. The timeline 300 may implement aspects of the wireless communications system 100 and 200 described with reference to FIGS. 1 and 2, respectively. The timeline 300 may be based on a configuration by a base station 105 or a UE 115, and implemented by the UE 115 to reduce power consumption for the UE 115. The timeline 300 may also be based on a configuration by the base station 105 or the UE 115, and implemented by the UE 115 to promote high reliability and low latency wireless communications in a wireless communications system, among other benefits. In the example of FIG. 3, the UE 115 may receive data traffic 305 over a burst of transport blocks 310. The data traffic 305 may be semi-periodic or periodic as described herein. For example, there may be a periodicity 315 between two consecutive bursts of transport blocks 310. The UE 115 may determine a power saving opportunity 320, based at least in part on the periodicity 315 between the two consecutive bursts of transport blocks 310, to experience added power savings. The UE 115 may disable monitoring of a downlink channel, such as a PDCCH for the data traffic 305 during the power saving opportunity 320, but may still perform other wireless operations such as physical downlink shared channel reception, downlink reference signal monitoring, uplink reference signal transmissions, and channel reporting (e.g., CSI reporting) during the power saving opportunity 320.

Figure 4:
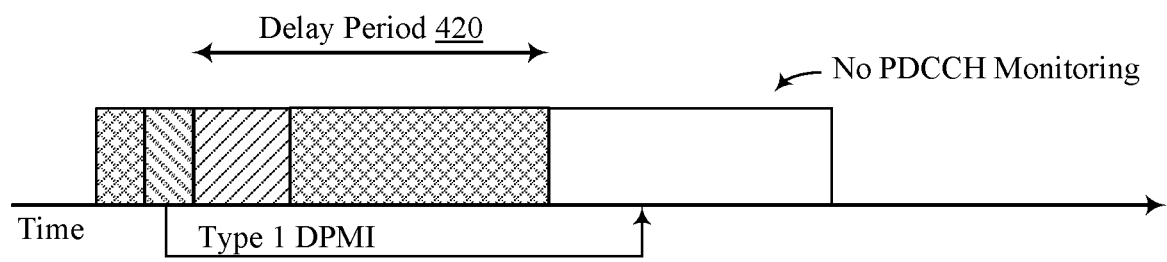
Figure 4:
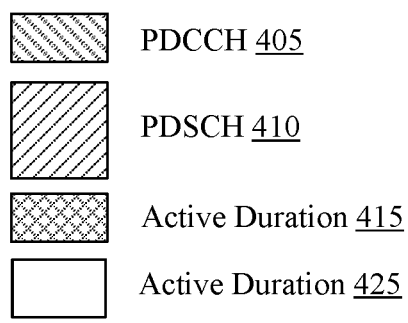

FIG. 4 illustrates an example of a timeline 400 in accordance with aspects of the present disclosure. The timeline 400 may implement aspects of the wireless communications system 100 and 200 described with reference to FIGS. 1 and 2, respectively. The timeline 400 may be based on a configuration by a base station 105 or a UE 115, and implemented by the UE 115 to decrease power consumption for the UE 115. The timeline 400 may also be based on a configuration by the base station 105 or the UE 115, and implemented by the UE 115 to promote high reliability and low latency wireless communications in a wireless communications system, among other benefits.

In the example of FIG. 4, the base station 105 may transmit one or more downlink channels to the UE 115. For example, the base station 105 may transmit a PDCCH 405 and a PDSCH 410 during an active duration 415. The PDCCH 405 may schedule the PDSCH 410 that may include a burst of transport blocks carrying data traffic. In some examples, the data traffic may be semi-periodic or periodic as described herein. For example, the data traffic may be XR data traffic, and in some examples, may be an XR frame segmented into multiple XR slices. The base station 105 may transmit, and the UE 115 may receive, a burst of transport blocks carrying the data traffic on the PDSCH 410.

The UE 115 may receive a message, for example a DCI message on the PDCCH 405. The DCI message may include an indication (e.g., a DPMI) to disable monitoring of PDCCH during at least a portion of the active duration 415. The UE 115 may disable monitoring of PDCCH after the received DCI message or some duration (e.g., x slots or x ms, where x is an integer value or a non-integer value) after the received DCI message. For example, the UE 115 may disable monitoring of PDCCH after a delay period 420, and as a result the UE 115 may not monitor for PDCCH during an active duration 425. The delay period 420 may be a duration between a time the UE 115 received the DCI message and a time when the UE 115 disables the monitoring of PDCCH. The delay period 420 may enable the base station 105 to schedule additional transport blocks, which may be a last transport block of a burst of transport blocks. The delay period 420 may also avoid unnecessary PDCCH monitoring.

Figure 5A:
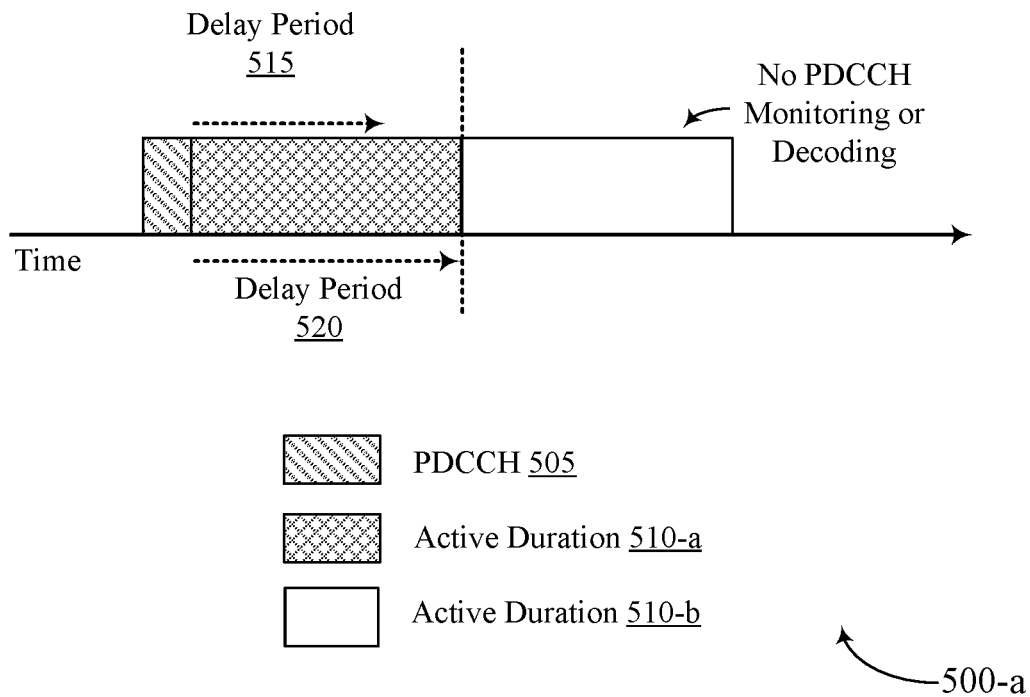
FIGS. 5A and 5B illustrate example of timelines in accordance with aspects of the present disclosure.

FIG. 5A illustrates an example of a timeline 500-a in accordance with aspects of the present disclosure. The timeline 500-a may implement aspects of the wireless communications system 100 and 200 described with reference to FIGS. 1 and 2, respectively. The timeline 500-a may be based on a configuration by a base station 105 or a UE 115, and implemented by the UE 115 to decrease power consumption for the UE 115. The timeline 500-a may also be based on a configuration by the base station 105 or the UE 115, and implemented by the UE 115 to promote high reliability and low latency wireless communications in a wireless communications system, among other benefits.

In the example of FIG. 5A, the base station 105 may transmit a downlink channel, such as a downlink control channel to the UE 115. For example, the base station 105 may transmit a PDCCH 505 carrying a DPMI (e.g., a first DPMI type or a second DPMI type) during an active duration 510-a. The PDCCH 505 may carry control information scheduling one or more downlink data channels, for example PDSCH including a burst of transport blocks carrying data traffic. In some examples, the data traffic may be semi-periodic or periodic as described herein. The UE 115 may perform blind decoding on the PDCCH 505. The blind decoding on the PDCCH 505 may correspond to a delay period 515 (also referred to as a decoding delay period) following the PDCCH 505.

The UE 115 may continue to monitor for the PDCCH 505 until the UE 115 completes decoding the PDCCH 505. For example, the UE 115 may monitor for the PDCCH 505 until the UE 115 completes decoding the PDCCH 505 because the UE 115 may be unaware whether discontinuous monitoring for downlink channels is enabled by the PDCCH 505. Thus, until the UE 115 finishes decoding the PDCCH 505, the UE 115 continues to monitor for the PDCCH 505. In some examples, the UE 115 may continue to blind decode on the PDCCH 505 until a delay period 520 lapses. The delay period 515 and the delay period 520 may begin at a same time instance, for example, following the PDCCH 505. This allows additional downlink channels (e.g., additional PDCCH) to be scheduled. Once the delay period 520 lapses, the UE 115 may disable monitoring the PDCCH 505, during the active duration 510-b. In the example of FIG. 5A, the delay period 520 may be greater than or equal to the decoding delay period. As such, the UE 115 may avoid any unnecessary downlink channel monitoring of PDCCH and decoding after the delay period 520 lapses. As a result, the UE 115 may experience added power saving.

Figure 5B:
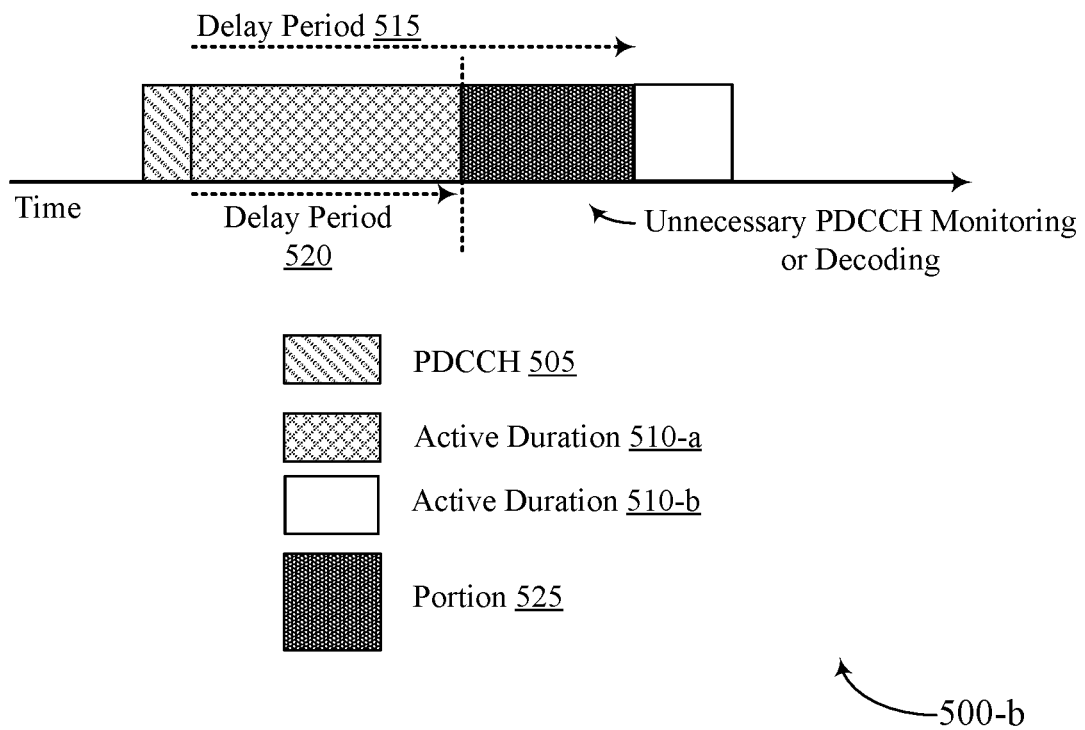

FIG. 5B illustrates an example of a timeline 500-b in accordance with aspects of the present disclosure. The timeline 500-b may implement aspects of the wireless communications system 100 and 200 described with reference to FIGS. 1 and 2, respectively. The timeline 500-b may be based on a configuration by a base station 105 or a UE 115, and implemented by the UE 115 to drop power consumption for the UE 115. The timeline 500-b may also be based on a configuration by the base station 105 or the UE 115, and implemented by the UE 115 to promote high reliability and low latency wireless communications in a wireless communications system, among other benefits.

In the example of FIG. 5B, the base station 105 may transmit a downlink channel, such as a downlink control channel to the UE 115. For example, the base station 105 may transmit a PDCCH 505 during an active duration 510-a, which may be an active portion of a DRX cycle. The PDCCH 505 may carry a DPMI (e.g., a first DPMI type or a second DPMI type). The PDCCH 505 may carry control information scheduling one or more downlink data channels, for example PDSCH including a burst of transport blocks carrying data traffic. In some examples, the data traffic may be semi-periodic or periodic as described herein. The UE 115 may perform blind decoding on the PDCCH 505. The blind decoding on the PDCCH 505 may correspond to a delay period 515 (also referred to as a decoding delay period).

The UE 115 may continue to monitor for the PDCCH 505 until the UE 115 completes decoding the PDCCH 505. For example, the UE 115 may monitor for the PDCCH 505 until the UE 115 completes decoding the PDCCH 505 because the UE 115 may be unaware whether discontinuous monitoring for downlink channels is enabled by the PDCCH 505. In some examples, the UE 115 may continue to blind decode on the PDCCH 505 which may extend into a delay period 520 corresponding to discontinuous monitoring of downlink channels (e.g., PDCCH). Thus, the delay period 520 may be less than the delay period 515. The delay period 515 and the delay period 520 may begin at a same time instance, for example, following the PDCCH 505. In some cases, it may be unnecessary for the UE 115 to continue monitoring for the PDCCH 505 during a portion 525 of the active duration 510 because the base station 105 may have stopped transmitting the PDCCH 505 or additional PDCCH to the UE 115.

Thus, a long decoding time (e.g., delay period 515) could introduce unnecessary PDCCH monitoring. The UE 115 may therefore perform blind decoding on the PDCCH 505 until the delay period 515 lapses and regardless of the delay period 520 is not running. In some examples, to assure that the delay period 515 does not exceed the delay period 520, the UE 115 may transmit capability information to the base station 105 that may include an indication of the delay period 520. For example, the UE 115 may assign a value (e.g., a length) for the delay period 520. As such, the base station 105 may identify when to stop transmitting PDCCH to the UE 115 because the UE 115 will disable monitoring for PDCCH after the delay period 520, for example, during the active duration 510-b. As a result, the UE 115 may experience added power saving.

Figure 6:
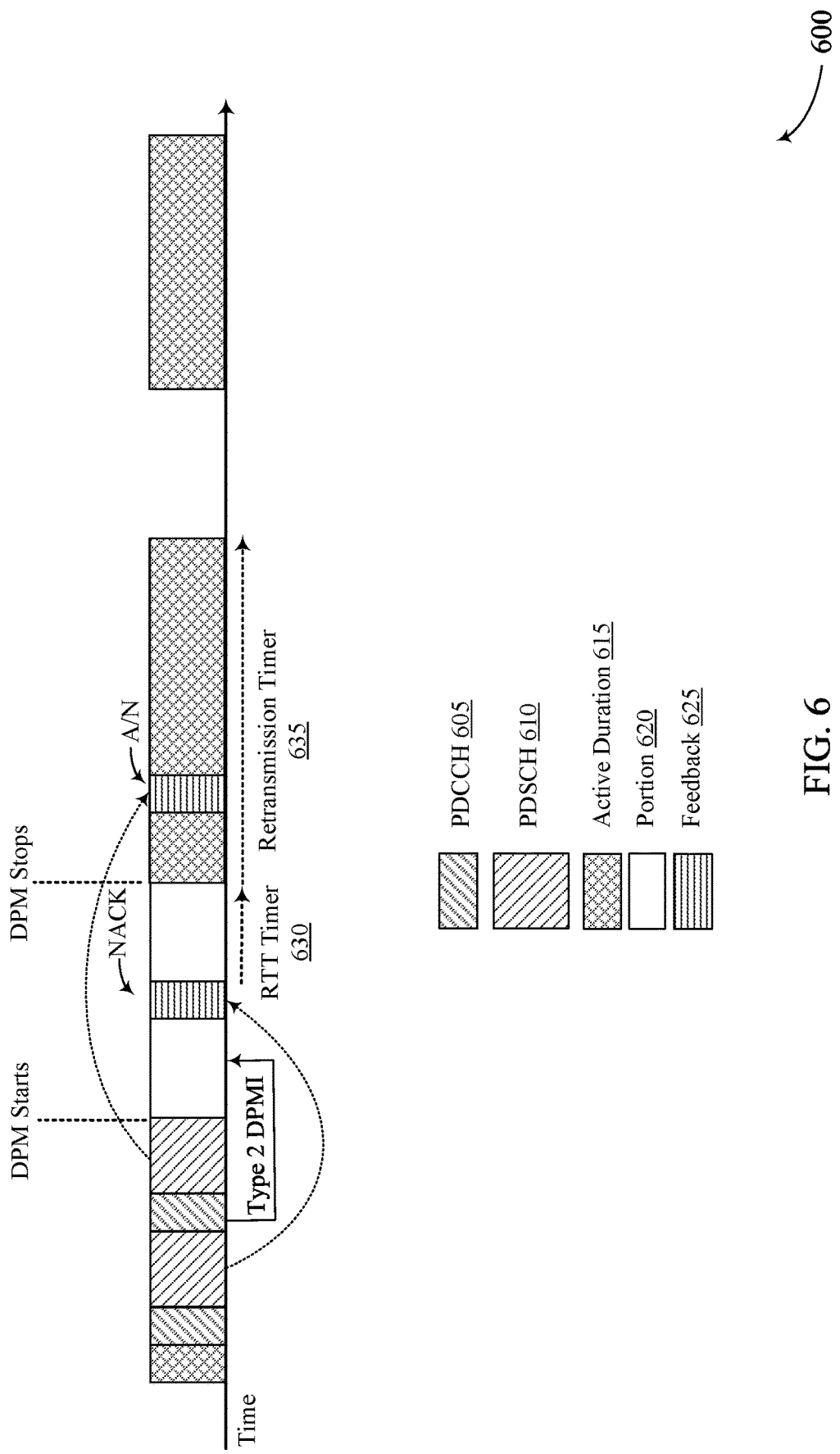
FIGS. 6 through 8 illustrate examples of timelines in accordance with aspects of the present disclosure.

FIG. 6 illustrates an example of a timeline 600 in accordance with aspects of the present disclosure. The timeline 600 may implement aspects of the wireless communications system 100 and 200 described with reference to FIGS. 1 and 2, respectively. The timeline 600 may be based on a configuration by a base station 105 or a UE 115, and implemented by the UE 115 to decrease power consumption for the UE 115. The timeline 600 may also be based on a configuration by the base station 105 or the UE 115, and implemented by the UE 115 to promote high reliability and low latency wireless communications in a wireless communications system, among other benefits.

By way of example, the UE 115 may operate in a DRX mode. In the DRX mode, the UE 115 may enable monitoring downlink channels carrying control information or data, or both, during an active duration of a DRX cycle. While in the active duration, the UE 115 may be in an active state. That is, a receiver or a transmitter, or both, of the UE 115 may be powered ON. Likewise, the UE 115 may disable monitoring the downlink channels during an inactive duration of the DRX cycle. While in the inactive duration, the UE 115 may be in an inactive state. That is, a receiver or a transmitter, or both, of the UE 115 may be powered OFF for reduced power consumption. Alternatively, the UE 115 may might not operate in a DRX mode.

The base station 105 may transmit a downlink channel, such as a downlink control channel or a downlink data channel, or both, to the UE 115. For example, the base station 105 may transmit a PDCCH 605 or a PDSCH 610, or both, during an active duration 615, which may be an active portion of a DRX cycle. The PDCCH 505 may carry control information scheduling one or more downlink data channels (e.g., the PDSCH 610) including a burst of transport blocks carrying data traffic. In some examples, the data traffic may be semi-periodic or periodic as described herein. For example, the data traffic may be XR data traffic, and in some examples, may be an XR frame segmented into multiple XR slices. The base station 105 may transmit, and the UE 115 may receive, one or multiple bursts of transport blocks carrying the data traffic on downlink channels during the active duration 615 of a DRX cycle.

The UE 115 perform blind decoding on the PDCCH 605 until a discontinuous monitoring delay period lapses as described in FIGS. 5A and 5B, respectively. As illustrated in FIG. 6, a second PDCCH 605 may carry a DPMI (e.g., a type 2 DPMI). The UE 115 may disable monitoring the PDCCH 605 during a portion 620 of the active duration 615 of a DRX cycle. The UE 115 may however continue to perform other wireless operations during the portion 620 of the active duration 615. For example, the UE 115 may transmit, to the base station 105, a feedback 625. The feedback 625 may be a HARQ feedback (e.g., a positive acknowledgment or a negative acknowledgment). In the example of FIG. 6, the feedback 625 may be a negative acknowledgment, which may indicate that the UE 115 did not receive a transport block of a burst of transport blocks. In some examples, the failed reception of the transport block may be a last transport block of the burst of transport blocks.

The UE 115 may active a round trip timer (RTT) timer 630, for example, based at least in part on the failed reception of the transport block. While the RTT timer 630 is running, the UE 115 may keep disabling monitoring of the PDCCH 605. In some examples, the UE 115 may enable a retransmission timer 635 if the UE 115 has transmitted a negative acknowledgement to the base station 105, which may define a duration the UE 115 may await a PDCCH scheduling an incoming retransmission from the base station 105. The retransmission may be of the last transport block previously not received. The UE 115 may enable monitoring of the PDCCH 605 during a portion of the active duration 615 based on the retransmission timer 635 and disabling monitoring of the PDCCH 605 when the retransmission timer 635 is not running.

The retransmission timer 635 may provide scheduling flexibility for the base station 105. The UE 115 may determine when the retransmission of the last transport block previously not received may occur, and as a result the UE 115 may reduce a period for PDCCH monitoring. The UE 115 may reduce a duration (e.g., a length) of the retransmission timer 635, for example based at least in part on a timing of the last transport block with respect to a beginning of an inactive portion of the DRX cycle. The base station 105 may, in some examples, configure the UE 115 to use the reduced retransmission timer 635 over a DRX cycle (e.g., all through a CDRX operation) and not exclusively for the retransmission of the last transport block.

In some other examples, the base station 105 may transmit, and the UE 115 may receive, a message including an indication of a value of the retransmission timer 635. As such, the UE 115 may reduce the retransmission timer 635 based at least in part on the indicated value. In other words, the base station 105 may provide an explicitly dynamic retransmission timer indication for a last transport block retransmission. The message may be a DCI message scheduling the last transport block to indicate to the UE 115 to use a reduced retransmission timer. Alternatively, the UE 115 may reduce the retransmission timer 635 based at least in part on a default value of the retransmission timer 635 configured in an RRC message (e.g., an RRC setup message). The UE 115 may remove an offset from the value of the retransmission timer 635 or may apply a scaling factor (e.g., a scaling factor smaller than 1) to the value of the retransmission timer 635.

Additionally or alternatively, the UE 115 may determine a retransmission mask, which may be applied to the retransmission timer 635 for the last transport block retransmission. The retransmission mask may be a portion within the active duration 615 when the reduced retransmission timer 635 is running where the UE 115 monitors the PDCCH 605. For example, the UE 115 may receive a PDCCH 605 scheduling a retransmission of the last transport block and may receive the retransmission of the last transport block during a portion of the active duration 615 associated with the reduced retransmission timer 635. In other words, the UE 115 may perform synchronous retransmission of the last transport block. For example, a PDCCH 605 scheduling the retransmission and data are exclusively expected during certain portions (e.g., slots) based on a fixed timing relationship with the last transport block and/or the reported feedback. The portion may be based at least in part on a relationship between a first time associated with the received PDCCH 605 scheduling the transmission of the last transport block and a second time of a transmission of the last transport block or a third time of the transmitted feedback 625 (e.g., negative acknowledgment feedback) for the last transport block. In some examples, the received message from the base station 105 may include a bitmap identifying a set of candidate durations for receiving the PDCCH scheduling candidate retransmissions of the last transport block. For example, the bitmap may indicate a set of slots where PDCCH scheduling potential retransmission may occur. The portion of the active duration 615 associated with the reduced retransmission timer 635 may be indicated based at least in part on the bitmap. The UE 115 may thereby reduce a retransmission timer and enable or disable monitoring of the PDCCH 605 appropriately.

In some cases, there may be no mechanism available for stopping the retransmission timer 635 even when a feedback is a positive acknowledgment that is transmitted by the UE 115 for a received transport block. The UE 115 may stop running the retransmission timer 635 when the feedback is a positive acknowledgment. For downlink transmissions, as soon as the UE 115 transmits a positive acknowledgment, the UE 115 may be configured to determine that a current burst of transport blocks or retransmitted transport block is received and can stop running the retransmission timer 635. For uplink transmissions, there is no explicit feedback (e.g., positive acknowledgment, negative acknowledgement) from the base station 105. The UE 115 may be configured to receive an implicit positive acknowledgment based at least in part on an expiration of the retransmission timer 635 (e.g., an uplink retransmission timer). As such, the UE 115 may begin and end discontinuous monitoring of a PDCCH based at least in part on whether an RTT timer or a DRX retransmission timer is running or not running. The UE 115 may thereby experience power saving.

Figure 7:
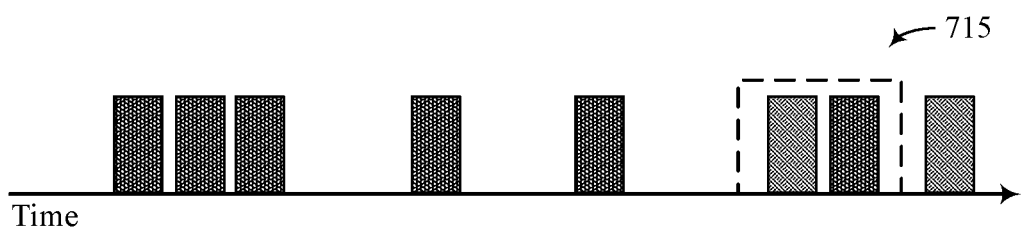

FIG. 7 illustrates an example of a timeline 700 in accordance with aspects of the present disclosure. The timeline 700 may implement aspects of the wireless communications system 100 and 200 described with reference to FIGS. 1 and 2, respectively. The timeline 700 may be based on a configuration by a base station 105 or a UE 115, and implemented by the UE 115 to decrease power consumption for the UE 115. The timeline 700 may also be based on a configuration by the base station 105 or the UE 115, and implemented by the UE 115 to promote high reliability and low latency wireless communications in a wireless communications system, among other benefits.

In the example of FIG. 7, the base station 105 may transmit, and the UE 115 may receive, a first burst of transport blocks including transport blocks 705 or a second burst of transport blocks including transport blocks 710, or a combination thereof. The first and second burst of transport blocks may carry periodic or semi-periodic data traffic. For example, as described herein, the UE 115 may support XR applications, which may have periodic or semi-periodic XR data traffic and may be an XR frame segmented into multiple XR slices. The base station 105 may transmit, and the UE 115 may receive, the first and second bursts of transport blocks carrying the multiple XR slices. In some cases, a last transport block 705 of the first burst of transport blocks or a retransmission of the last transport block 705 of the first burst of transport blocks may occur during a portion 715 associated with transmission of the second burst of transport blocks. The base station 105 may transmit, and the UE 115 may receive, an indication to disable monitoring PDCCH before beginning of the second burst of transport blocks to avoid possible blocking issues of the transport blocks 710 of the second burst of transport block.

Figure 8:
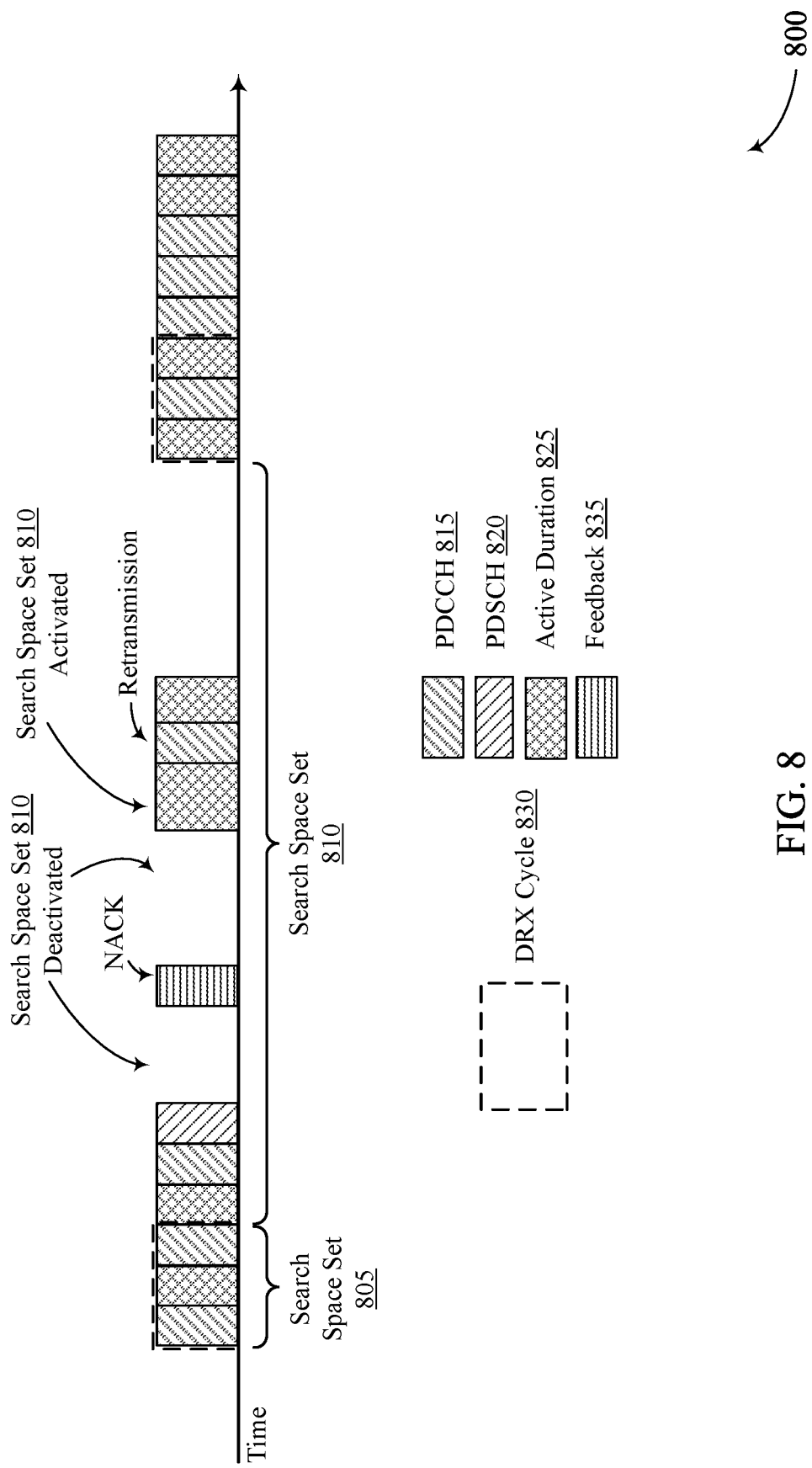

FIG. 8 illustrates an example of a timeline 800 in accordance with aspects of the present disclosure. The timeline 800 may implement aspects of the wireless communications system 100 and 200 described with reference to FIGS. 1 and 2, respectively. The timeline 800 may be based on a configuration by a base station 105 or a UE 115, and implemented by the UE 115 to decrease power consumption for the UE 115. The timeline 800 may also be based on a configuration by the base station 105 or the UE 115, and implemented by the UE 115 to promote high reliability and low latency wireless communications in a wireless communications system, among other benefits.

In the example of FIG. 8, the UE 115 may be configured to active and deactivate a search space set. In some examples, the UE 115 may be configured with multiple search space sets. For example, the UE 115 may be configured with a search space set 805 and a search space set 810. The UE 115 may be configured to active and deactivate the search space set 805 or the search space set 810, or both, based at least in part on a layer 1 (L1) signal such as a DCI in a PDCCH, which may include an indication to active or deactivate the search space set 805 or the search space set 810, or both.

The base station 105 may transmit, and the UE 115 may receive, one or more downlink channels, for example PDCCH 815 scheduling PDSCH 820 associated with a burst of transport blocks. In some examples, the base station 105 may transmit, and the UE 115 may receive, one or more downlink channels during an active duration 825 of a DRX cycle 830. With reference to FIG. 8, the search space set 805 may include one or more time and frequency resources (e.g., slots and subcarriers) of the active duration 825 of the DRX cycle 830 is configured. The search space set 810 may include one or more time and frequency resources (e.g., slots and subcarriers) where an active duration of a DRX cycle is not configured. For example, slots not covered by the active duration 825 of the DRX cycle 830.

The UE 115 may therefore activate the search space set 805 during the active duration 825 of the DRX cycle 830 and may deactivate the search space set 805 after the active duration 825 of the DRX cycle 830 lapses. In some examples, the search space set 810 may be deactivated initially within the active duration 825, and the UE 115 may activate the search space set 810 based on a retransmission condition. In the example of FIG. 8, the UE 115 transmit, and the base station 105 may receive, a feedback 835 associated with one or more transport blocks of the burst of transport blocks. For example, the UE 115 transmit, and the base station 105 may receive, a feedback 835 associated with a last transport block. The feedback 835 may be a HARQ feedback message, which may include a negative acknowledgment for the last transport block. In some examples, the negative acknowledgment may trigger an activation of the search space set 810. In some other examples, when a last transport block is granted, the base station 105 may trigger the activation of the search space set 810 for potential retransmission of the last transport block. The UE 115 may monitor PDCCH scheduling the retransmission in the search space set 810.

Figure 9:
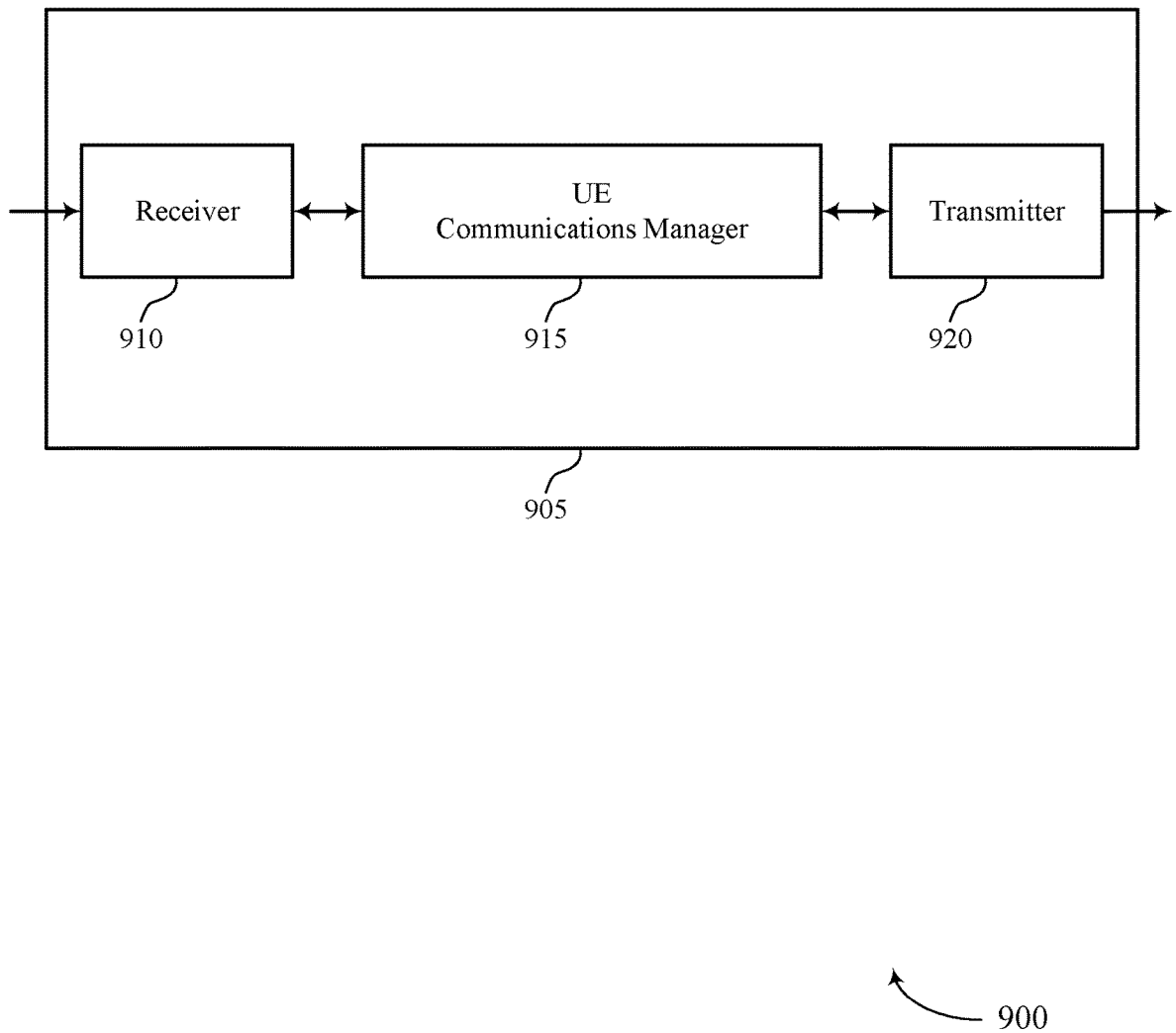
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a UE 115 as described herein. The device 905 may include a receiver 910, a UE communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to discontinuous downlink channel monitoring, etc.). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may transmit capability information including an indication of a discontinuous monitoring delay period, receive a message including an indication to adjust monitoring of a PDCCH, monitor for the PDCCH during the discontinuous monitoring delay period, and adjust monitoring for the PDCCH following the discontinuous monitoring delay period during a temporal period based on the received indication to adjust monitoring of the PDCCH, where downlink reference signal monitoring, uplink reference signal transmissions, and channel reporting are enabled during the temporal period while monitoring of the PDCCH is adjusted.

The UE communications manager 915 may also transmit acknowledgment feedback for a last transport block of a burst of transport blocks, reduce a retransmission timer at the UE based on a timing of the last transport block with respect to a beginning of an inactive period for the UE, monitor for a PDCCH based on the reduced retransmission timer, and enter a sleep mode based on the monitoring, the reduced retransmission timer, and the inactive period for the UE. The UE communications manager 915 may be an example of aspects of the UE communications manager 1210 described herein.

The UE communications manager 915 may be implemented as an integrated circuit or chipset for a modem, and the receiver 910 and the transmitter 920 may be implemented as analog components (e.g., amplifiers, filters, antennas, etc.) coupled with the modem to enable wireless transmission and reception for the device 905. The UE communications manager 915 as described herein may be implemented to realize one or more potential advantages. Various implementations may enable power saving for the device 905. At least one implementation may enable the UE communications manager 915 to effectively adjust monitoring of a PDCCH during a temporal period following a delay period, and perform other wireless operations CSI-RS monitoring, CSI reporting, sounding reference signal (SRS) transmissions during the temporal period. At least one implementation may enable the UE communications manager 915 to adjust or enable monitoring of a PDCCH based at least in part on a reduced retransmission timer.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

By including or configuring the UE communications manager 915 in accordance with examples as described herein, the device 905 (e.g., a processor controlling or otherwise coupled to the receiver 910, the transmitter 920, the UE communications manager 915, or a combination thereof) may support techniques for reduced processing, reduced power consumption, and more efficient utilization of communication resources.

Figure 10:
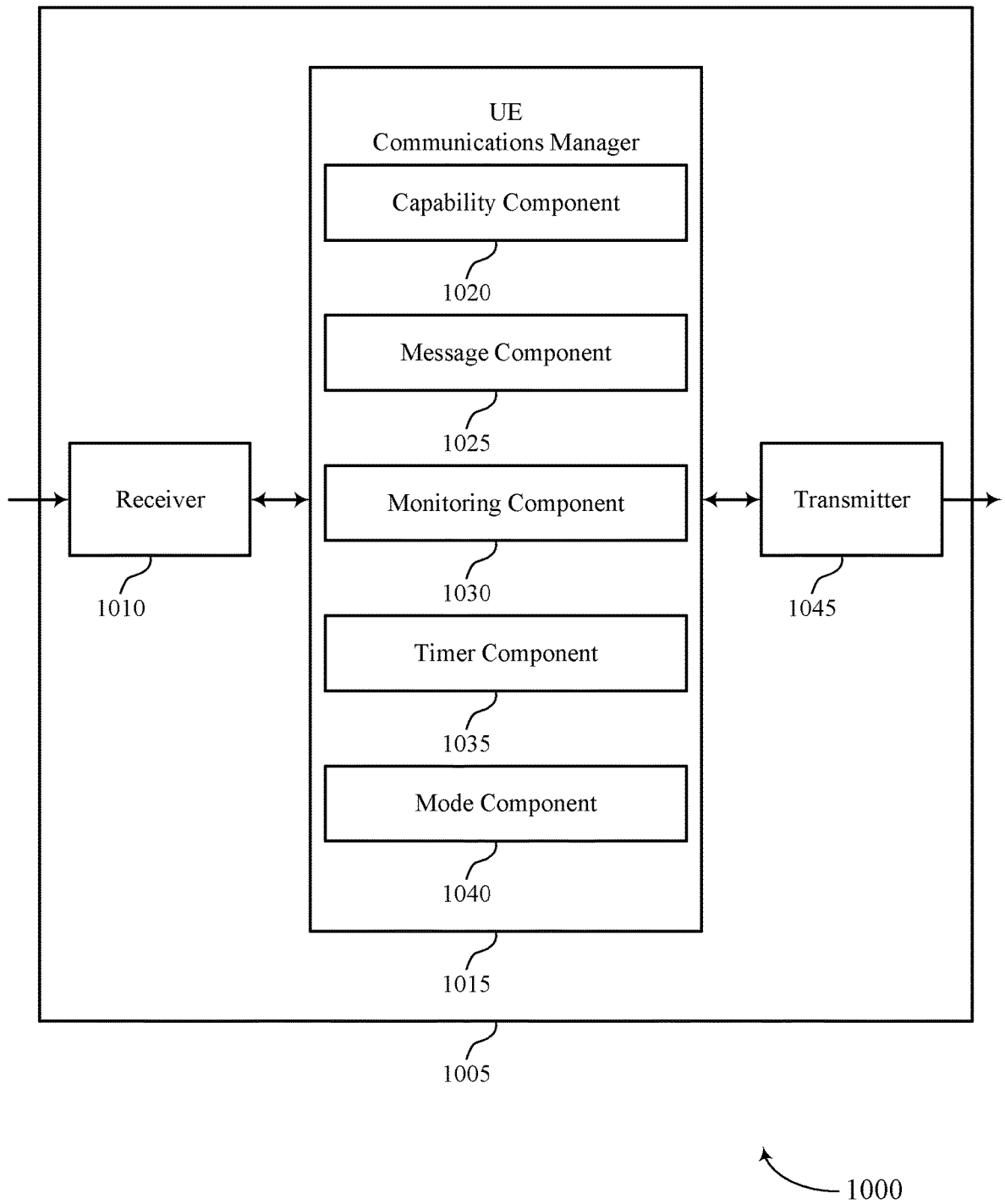

FIG. 10 shows a block diagram 1000 of a device 1005 in accordance with aspects of the present disclosure. The device 1005 may be an example of aspects of a device 905, or a UE 115 as described herein. The device 1005 may include a receiver 1010, a UE communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to discontinuous downlink channel monitoring, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include a capability component 1020, a message component 1025, a monitoring component 1030, a timer component 1035, and a mode component 1040. The UE communications manager 1015 may be an example of aspects of the UE communications manager 1210 described herein.

The capability component 1020 may transmit capability information including an indication of a discontinuous monitoring delay period. The message component 1025 may receive a message including an indication to adjust monitoring of a PDCCH. The monitoring component 1030 may monitor for the PDCCH during the discontinuous monitoring delay period and adjust monitoring for the PDCCH following the discontinuous monitoring delay period during a temporal period based on the received indication to adjust monitoring of the PDCCH, where downlink reference signal monitoring, uplink reference signal transmissions, and channel reporting are enabled during the temporal period while monitoring of the PDCCH is adjusted.

The message component 1025 may transmit acknowledgment feedback for a last transport block of a burst of transport blocks. The timer component 1035 may reduce a retransmission timer at the device 1005 based on a timing of the last transport block with respect to a beginning of an inactive period for the device 1005. The monitoring component 1030 may monitor for a PDCCH based on the reduced retransmission timer. The mode component 1040 may enter a sleep mode based on the monitoring, the reduced retransmission timer, and the inactive period for the device 1005.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
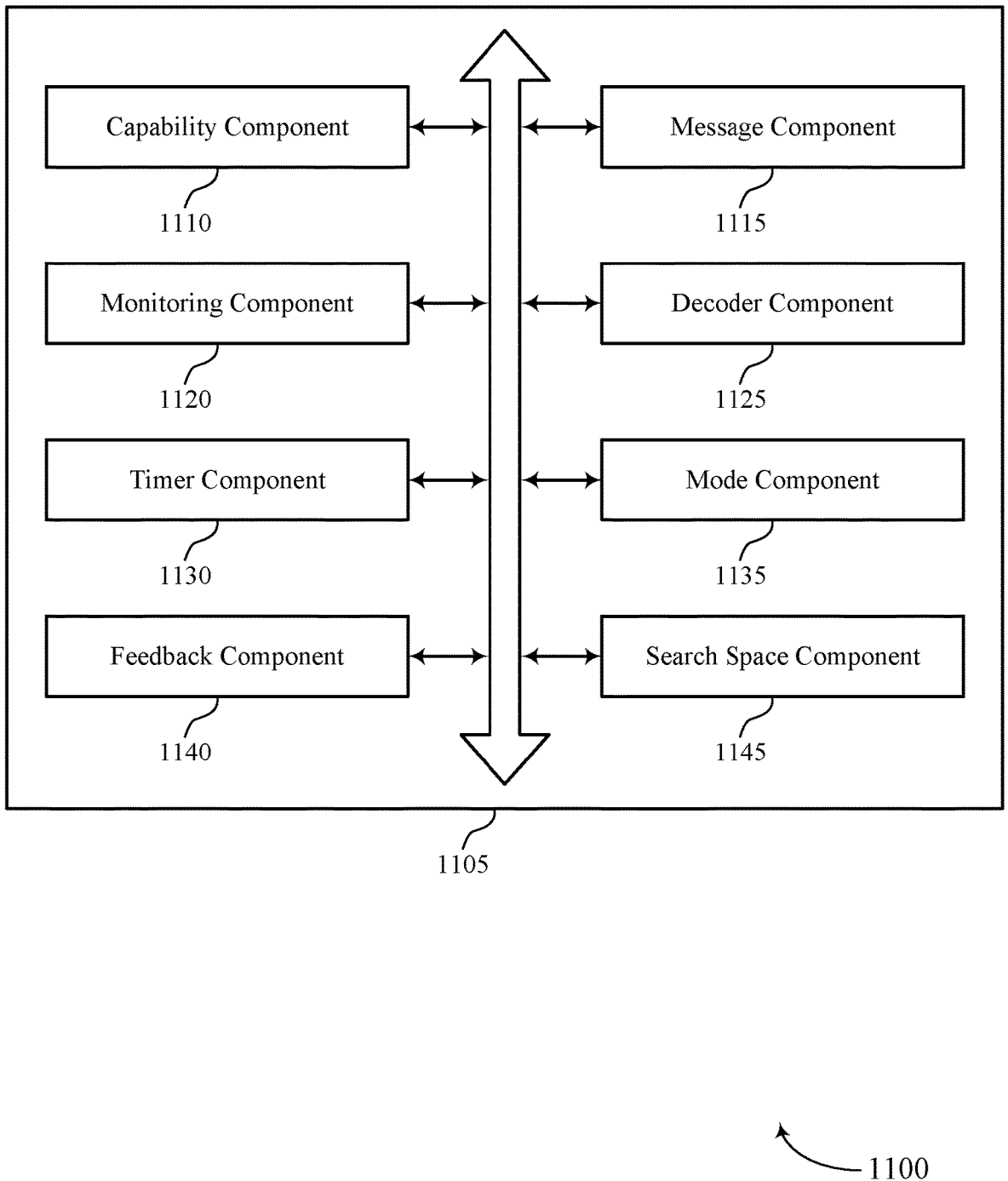
FIG. 11 shows a block diagram of a user equipment (UE) communications manager in accordance with aspects of the present disclosure.

FIG. 11 shows a block diagram 1100 of a UE communications manager 1105 in accordance with aspects of the present disclosure. The UE communications manager 1105 may be an example of aspects of a UE communications manager 915, a UE communications manager 1015, or a UE communications manager 1210 described herein. The UE communications manager 1105 may include a capability component 1110, a message component 1115, a monitoring component 1120, a decoder component 1125, a timer component 1130, a mode component 1135, a feedback component 1140, and a search space component 1145. Each of these modules may communicate, directly or indirectly, with one another (e.g., via one or more buses).

The capability component 1110 may transmit capability information including an indication of a discontinuous monitoring delay period. In some cases, the discontinuous monitoring delay period includes a duration between a first time associated with the received message and a second time associated with adjusting the monitoring of the PDCCH during an active portion of a DRX cycle. The message component 1115 may receive a message including an indication to adjust monitoring of a PDCCH. In some examples, the message component 1115 may transmit acknowledgment feedback for a last transport block of a burst of transport blocks. In some examples, the message component 1115 may receive the indication to adjust monitoring of the PDCCH prior to the first transport block of a burst of transport blocks within an active portion of a DRX cycle. In some examples, the message component 1115 may receive a message including a bitmap identifying a set of candidate durations for monitoring the PDCCH for candidate retransmissions of the last transport block of the burst of transport blocks, where reducing the retransmission timer is based on the bitmap in the received message. In some cases, the message includes an RRC message or a DCI message. In some cases, the message includes a DCI message scheduling the PDSCH carrying the last transport block of the burst of transport blocks.

The monitoring component 1120 may monitor for the PDCCH during the discontinuous monitoring delay period. In some examples, the monitoring component 1120 may adjust monitoring for the PDCCH following the discontinuous monitoring delay period during a temporal period based on the received indication to adjust monitoring of the PDCCH, where downlink reference signal monitoring, uplink reference signal transmissions, and channel reporting are enabled during the temporal period while monitoring of the PDCCH is adjusted. In some examples, the monitoring component 1120 may monitor for a PDCCH based on the reduced retransmission timer. In some examples, the monitoring component 1120 may monitor the PDCCH while the retransmission timer is running. In some examples, the monitoring component 1120 may monitor for the PDCCH to receive the last transport block during a portion of a duration associated with the reduced retransmission timer. In some examples, the monitoring component 1120 may receive a second PDCCH scheduling a retransmission of the last transport block of the burst of transport blocks during a portion of a duration associated with the reduced retransmission timer. In some examples, the monitoring component 1120 may receive the retransmission of the last transport block of the burst of transport blocks. In some cases, the portion is based on a relationship between a first time associated with the PDCCH scheduling the transmission of the last transport block and a second time of a transmission of the last transport block or a third time of the transmitted acknowledgment feedback for the last transport block.

The timer component 1130 may reduce a retransmission timer at the UE based on a timing of the last transport block with respect to a beginning of an inactive period for the UE. In some examples, the timer component 1130 may enable the reduced retransmission timer over a DRX cycle. In some examples, the timer component 1130 may receive a message including an indication of a value of the retransmission timer, where reducing the retransmission timer is based on the value of the retransmission timer in the received message. In some examples, the timer component 1130 may remove an offset from the value of the retransmission timer based on the received message, where reducing the retransmission timer is based on removing the offset from the value of the retransmission timer. In some examples, the timer component 1130 may apply a scaling factor to the value of the retransmission timer based on the received message, where reducing the retransmission timer is based on applying the scaling factor to the value of the retransmission timer.

The mode component 1135 may enter a sleep mode based on the monitoring, the reduced retransmission timer, and the inactive period for the UE. The decoder component 1125 may perform blind decoding on the PDCCH until the delay period lapses. In some examples, the decoder component 1125 may refrain from performing blind decoding on the PDCCH in response to the discontinuous monitoring delay period lapsing. In some cases, receiving the message corresponds to a decoding delay period. In some cases, the discontinuous monitoring delay period is greater than or equal to the decoding delay period.

The feedback component 1140 may transmit a hybrid automatic repeat request feedback message based on receiving the burst of transport blocks during an active portion of a DRX cycle. In some examples, the feedback component 1140 may deactivate the reduced retransmission timer based on transmitting the hybrid automatic repeat request feedback message. In some examples, the feedback component 1140 may transmit a positive hybrid automatic repeat request feedback message based on receiving a transmission of the last transport block of the burst of transport blocks during a portion of a duration associated with the reduced retransmission timer.

The search space component 1145 may receive a message including an indication to deactivate a group of search space sets associated with an active portion of a DRX cycle based on a grant for the last transport block of the burst of transport blocks. In some examples, the search space component 1145 may deactivate the group of search space sets based on the received message. In some examples, the search space component 1145 may transmit a negative hybrid automatic repeat request feedback message for the last transport block of the burst of transport blocks based at least in part on the UE failing to receive the last transport block of the burst of transport blocks. In some examples, the search space component 1145 may activate a group of search space sets associated with retransmission of the last transport block of the burst of transport blocks based on the transmitted negative hybrid automatic repeat request feedback message, where the group of search space sets corresponds to an active portion of a DRX cycle.

Figure 12:
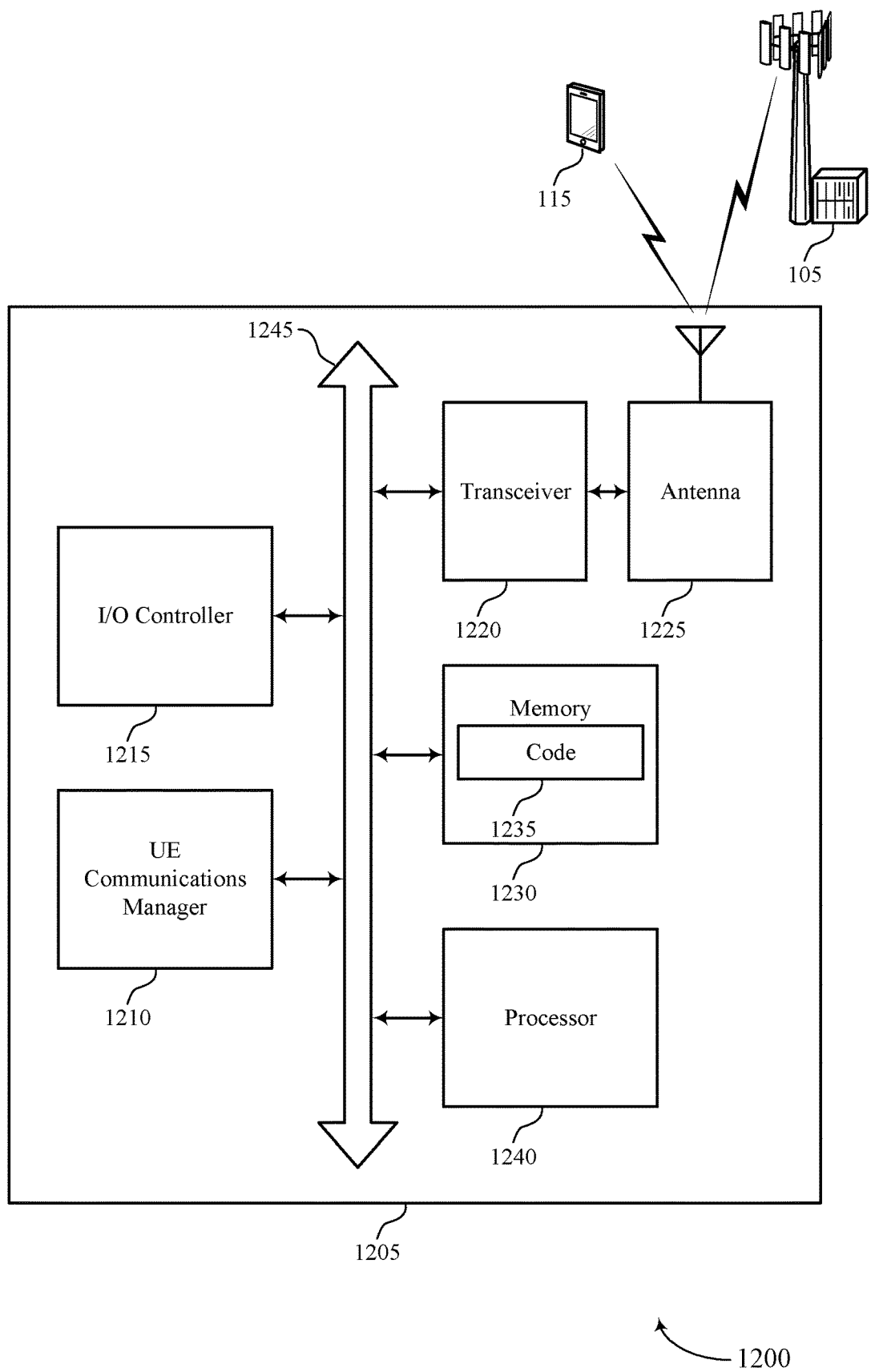
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The UE communications manager 1210 may transmit capability information including an indication of a discontinuous monitoring delay period, receive a message including an indication to adjust monitoring of a PDCCH, monitor for the PDCCH during the discontinuous monitoring delay period, and adjust monitoring for the PDCCH following the discontinuous monitoring delay period during a temporal period based on the received indication to adjust monitoring of the PDCCH, where downlink reference signal monitoring, uplink reference signal transmissions, and channel reporting are enabled during the temporal period while monitoring of the PDCCH is adjusted.

The UE communications manager 1210 may also transmit acknowledgment feedback for a last transport block of a burst of transport blocks, reduce a retransmission timer at the UE based on a timing of the last transport block with respect to a beginning of an inactive period for the UE, monitor for a PDCCH based on the reduced retransmission timer, and enter a sleep mode based on the monitoring, the reduced retransmission timer, and the inactive period for the UE.

The device 1205 as described herein may be implemented to realize one or more potential advantages. Various implementations may enable power saving for the device 1205. At least one implementation may enable the processor 1240 of the device 1205 (e.g., processor(s) controlling or incorporated with the UE communications manager 1210) to adjust monitoring of a PDCCH during a temporal period following delay period, and also perform other wireless operations CSI-RS monitoring, CSI reporting, SRS transmissions during the temporal period. At least one implementation may enable the processor 1240 of the device 1205 to adjust or enable monitoring of a PDCCH based on a reduced retransmission timer.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the device 1205 may include a single antenna 1225. However, in some cases, the device 1205 may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor 1240 to perform various functions described herein. In some cases, the memory 1230 may contain, among other things, a basic input/output system (BIOS) which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting discontinuous downlink channel monitoring).

By including or configuring the UE communications manager 1210 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

Figure 13:
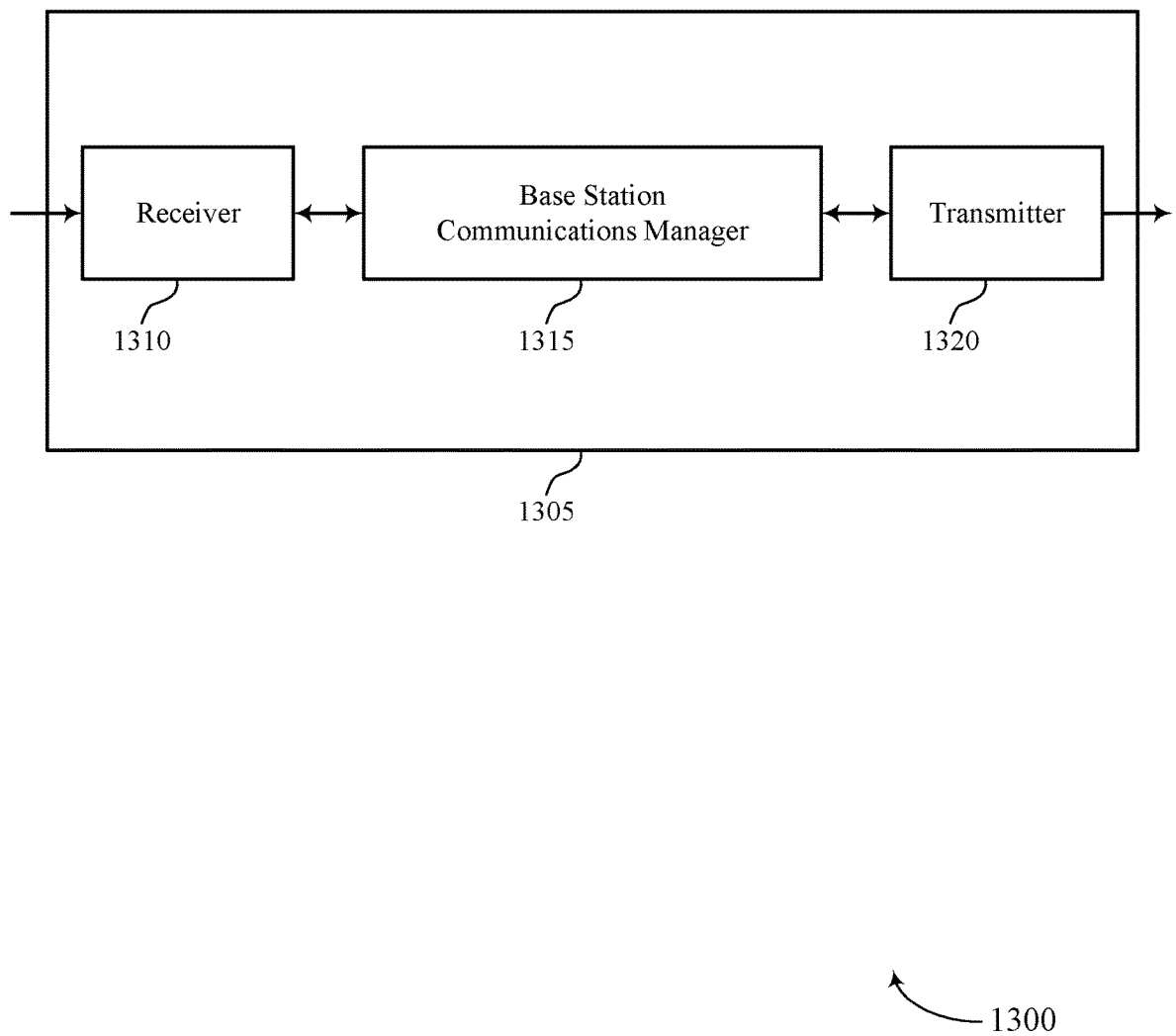
FIGS. 13 and 14 show block diagrams of devices in accordance with aspects of the present disclosure.

FIG. 13 shows a block diagram 1300 of a device 1305 in accordance with aspects of the present disclosure. The device 1305 may be an example of aspects of a base station 105 as described herein. The device 1305 may include a receiver 1310, a base station communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to discontinuous downlink channel monitoring, etc.). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may receive capability information including an indication of a discontinuous monitoring delay period, transmit a message including an indication to adjust monitoring of a PDCCH during a temporal period in which downlink reference signal monitoring, uplink reference signal transmissions, and channel reporting are enabled during the temporal period while monitoring of the PDCCH is adjusted, and transmit the PDCCH during the discontinuous monitoring delay period.

The base station communications manager 1315 may also transmit a last transport block of a burst of transport blocks to a UE, retransmit the last transport block on a PDCCH during a portion of a duration associated with a reduced retransmission timer, where the reduced retransmission timer is based on a timing of the last transport block with respect to a beginning of an inactive period for the UE, and receive acknowledgment feedback for the last transport block of the burst of transport blocks. The base station communications manager 1315 may be an example of aspects of the base station communications manager 1610 described herein.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

By including or configuring the base station communications manager 1315 in accordance with examples as described herein, the device 1305 (e.g., a processor controlling or otherwise coupled to the receiver 1310, the transmitter 1320, the base station communications manager 1315, or a combination thereof) may support techniques for reduced processing, reduced power consumption, and more efficient utilization of communication resources.

Figure 14:
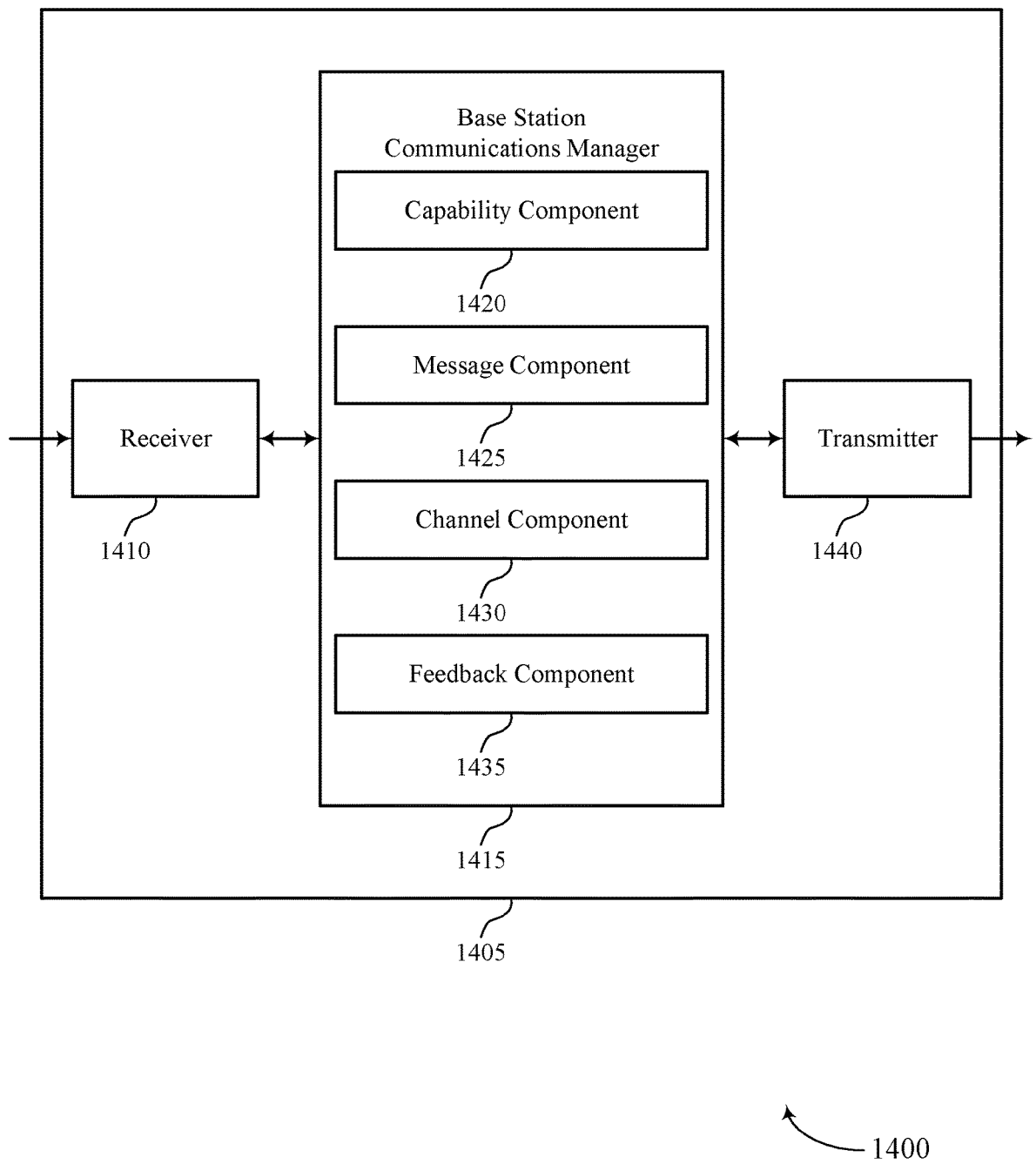

FIG. 14 shows a block diagram 1400 of a device 1405 in accordance with aspects of the present disclosure. The device 1405 may be an example of aspects of a device 1305, or a base station 105 as described herein. The device 1405 may include a receiver 1410, a base station communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to discontinuous downlink channel monitoring, etc.). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described herein. The base station communications manager 1415 may include a capability component 1420, a message component 1425, a channel component 1430, and a feedback component 1435. The base station communications manager 1415 may be an example of aspects of the base station communications manager 1610 described herein.

The capability component 1420 may receive capability information including an indication of a discontinuous monitoring delay period. The message component 1425 may transmit a message including an indication to adjust monitoring of a PDCCH during a temporal period in which downlink reference signal monitoring, uplink reference signal transmissions, and channel reporting are enabled during the temporal period while monitoring of the PDCCH is adjusted. The channel component 1430 may transmit the PDCCH during the discontinuous monitoring delay period. The channel component 1430 may transmit a last transport block of a burst of transport blocks to a UE and retransmit the last transport block on a PDCCH during a portion of a duration associated with a reduced retransmission timer, where the reduced retransmission timer is based on a timing of the last transport block with respect to a beginning of an inactive period for the UE. The feedback component 1435 may receive acknowledgment feedback for the last transport block of the burst of transport blocks.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
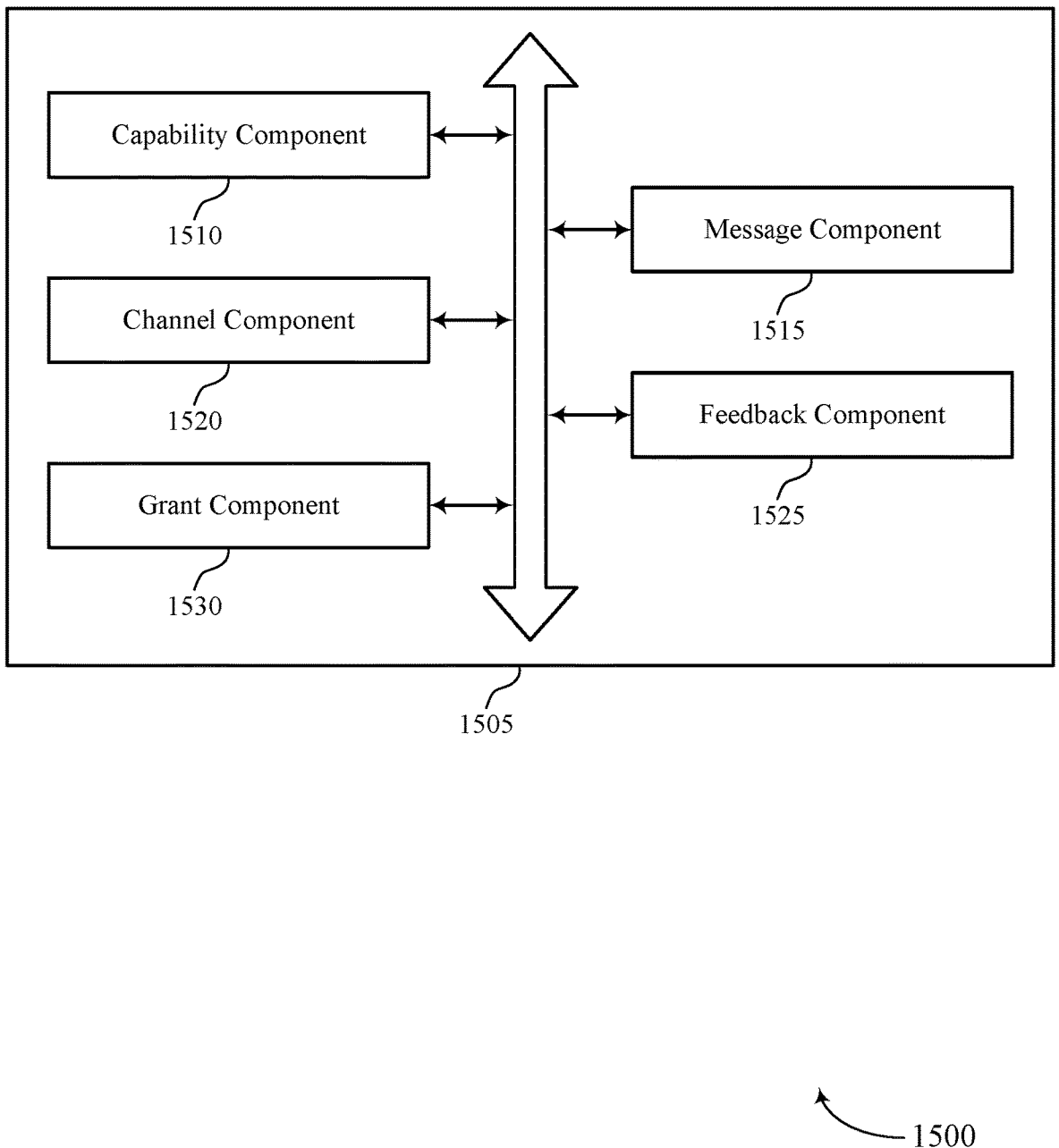
FIG. 15 shows a block diagram of a base station communications manager in accordance with aspects of the present disclosure.

FIG. 15 shows a block diagram 1500 of a base station communications manager 1505 in accordance with aspects of the present disclosure. The base station communications manager 1505 may be an example of aspects of a base station communications manager 1315, a base station communications manager 1415, or a base station communications manager 1610 described herein. The base station communications manager 1505 may include a capability component 1510, a message component 1515, a channel component 1520, a feedback component 1525, and a grant component 1530. Each of these modules may communicate, directly or indirectly, with one another (e.g., via one or more buses).

The capability component 1510 may receive capability information including an indication of a discontinuous monitoring delay period. In some cases, the discontinuous monitoring delay period includes a duration between a first time associated with reception of the transmitted message by the UE and a second time associated with adjusting the monitoring of the PDCCH by the UE. The message component 1515 may transmit a message including an indication to adjust monitoring of a PDCCH during a temporal period in which downlink reference signal monitoring, uplink reference signal transmissions, and channel reporting are enabled during the temporal period while monitoring of the PDCCH is adjusted.

In some examples, the message component 1515 may transmit the indication to adjust monitoring of the PDCCH prior to the first transport block of a burst of transport blocks within an active portion of a DRX cycle. In some examples, the message component 1515 may transmit a message including an indication of a value of the retransmission timer. In some examples, the message component 1515 may transmit a message including a bitmap identifying a set of candidate durations for physical downlink control channel scheduling candidate retransmissions of the last transport block of the burst of transport blocks. In some cases, the message includes an RRC message. In some cases, the message includes a DCI message scheduling the PDSCH carrying the last transport block of the burst of transport blocks.

The channel component 1520 may transmit the PDCCH during the discontinuous monitoring delay period. In some examples, the channel component 1520 may transmit a last transport block of a burst of transport blocks to a UE. In some examples, the channel component 1520 may retransmit the last transport block on a PDCCH during a portion of a duration associated with a reduced retransmission timer, where the reduced retransmission timer is based on a timing of the last transport block with respect to a beginning of an inactive period for the UE. In some cases, the channel component 1520 may transmit a second PDCCH scheduling a retransmission of the last transport block of the burst of transport blocks, where retransmitting the last transport block includes: transmitting the retransmission of the last transport block of the burst of transport blocks. In some cases, the portion is based on a relationship between a first time associated with the PDCCH scheduling the transmission of the last transport block and a second time of a transmission of the last transport block or a third time of the transmitted acknowledgment feedback for the last transport block by the UE.

The feedback component 1525 may receive acknowledgment feedback for the last transport block of the burst of transport blocks. In some examples, the feedback component 1525 may receive a HARQ feedback message based on retransmitting the last transport block during an active portion of a DRX cycle. The grant component 1530 may allocate a grant for the last transport block of the burst of transport blocks. In some examples, the grant component 1530 may transmit a message including an indication to deactivate a group of search space sets associated with an active portion of a DRX cycle based on the grant for the last transport block of the burst of transport blocks.

Figure 16:
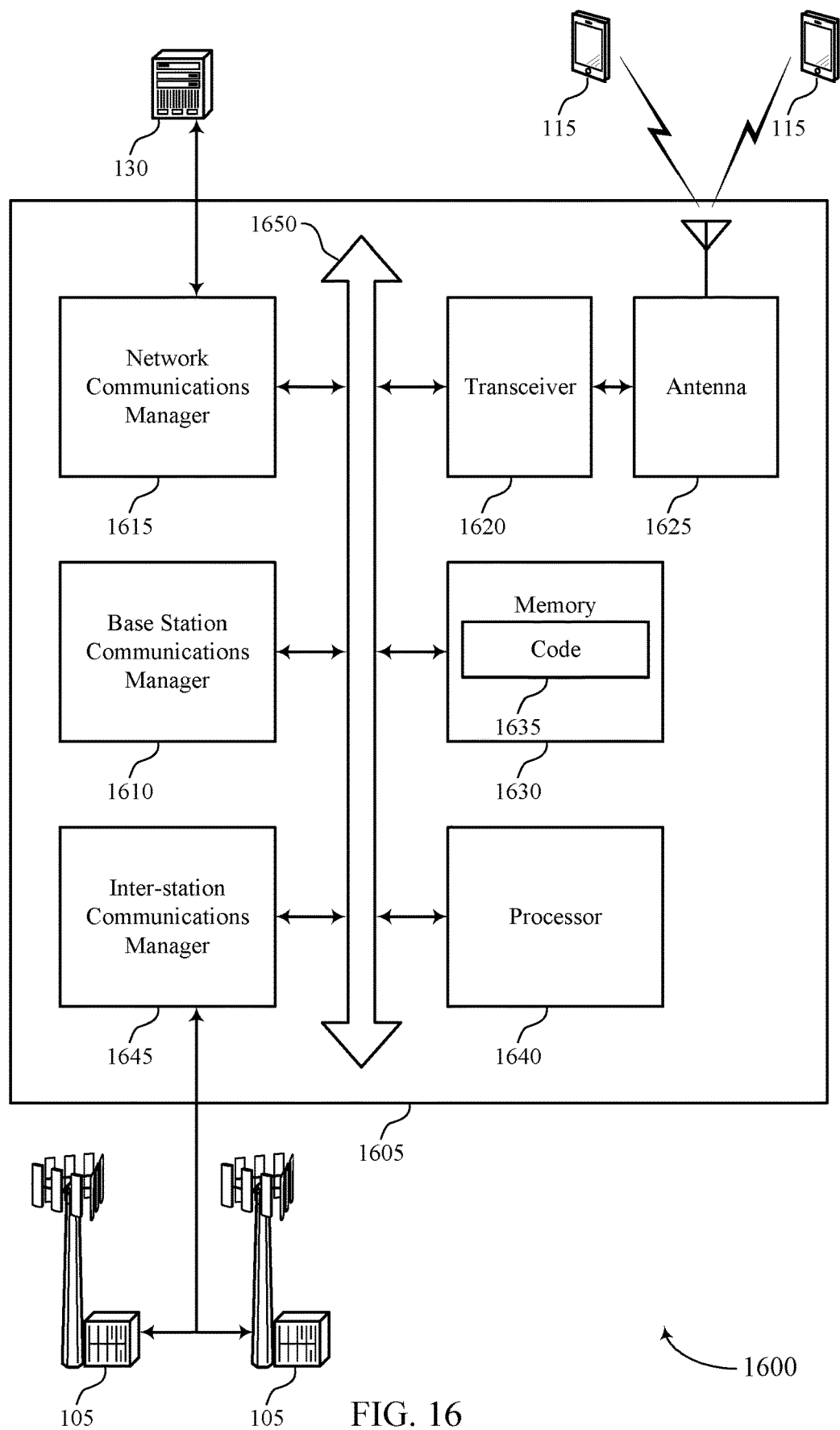
FIG. 16 shows a diagram of a system including a device in accordance with aspects of the present disclosure.

FIG. 16 shows a diagram of a system 1600 including a device 1605 in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The base station communications manager 1610 may receive capability information including an indication of a discontinuous monitoring delay period, transmit a message including an indication to adjust monitoring of a PDCCH during a temporal period in which downlink reference signal monitoring, uplink reference signal transmissions, and channel reporting are enabled during the temporal period while monitoring of the PDCCH is adjusted, and transmit the PDCCH during the discontinuous monitoring delay period.

The base station communications manager 1610 may also transmit a last transport block of a burst of transport blocks to a UE, retransmit the last transport block on a PDCCH during a portion of a duration associated with a reduced retransmission timer, where the reduced retransmission timer is based on a timing of the last transport block with respect to a beginning of an inactive period for the UE, and receive acknowledgment feedback for the last transport block of the burst of transport blocks.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas. In some cases, the device 1605 may include a single antenna 1625. However, in some cases, the device 1605 may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting discontinuous downlink channel monitoring).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

By including or configuring the base station communications manager 1610 in accordance with examples as described herein, the device 1605 may support techniques for improved communication reliability, reduced latency, improved user experience related to reduced processing, reduced power consumption, more efficient utilization of communication resources, improved coordination between devices, longer battery life, and improved utilization of processing capability.

Figure 17:
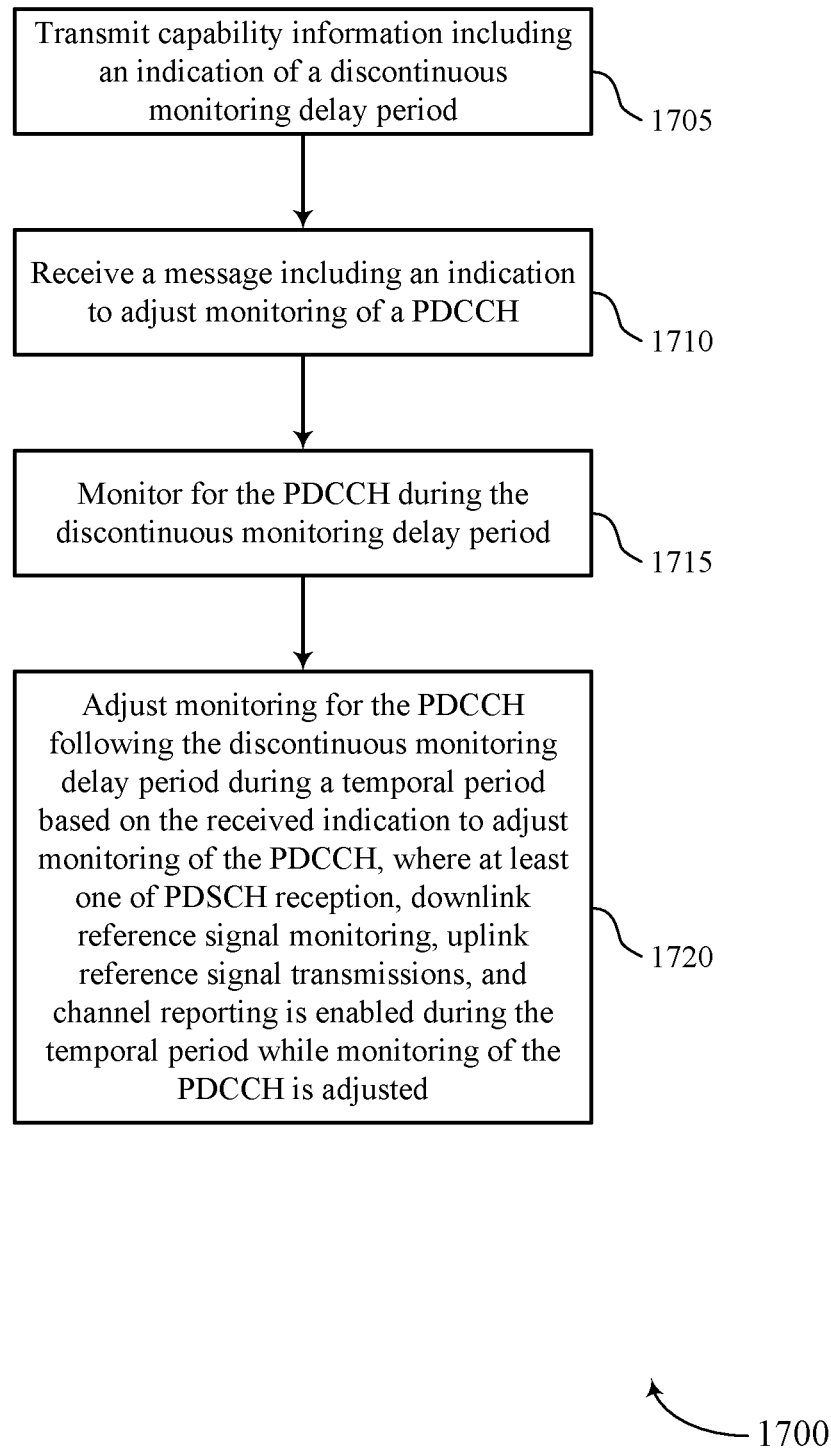
FIGS. 17 through 20 show flowcharts illustrating methods in accordance with aspects of the present disclosure.

FIG. 17 shows a flowchart illustrating a method 1700 in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may transmit capability information including an indication of a discontinuous monitoring delay period. The operations of 1705 may be performed according to the methods described herein. In some examples, aspects of the operations of 1705 may be performed by a capability component as described with reference to FIGS. 9 through 12.

At 1710, the UE may receive a message including an indication to adjust monitoring of a PDCCH. The operations of 1710 may be performed according to the methods described herein. In some examples, aspects of the operations of 1710 may be performed by a message component as described with reference to FIGS. 9 through 12.

At 1715, the UE may monitor for the PDCCH during the discontinuous monitoring delay period. The operations of 1715 may be performed according to the methods described herein. In some examples, aspects of the operations of 1715 may be performed by a monitoring component as described with reference to FIGS. 9 through 12.

At 1720, the UE may adjust monitoring for the PDCCH following the discontinuous monitoring delay period during a temporal period based on the received indication to adjust monitoring of the PDCCH, where downlink reference signal monitoring, uplink reference signal transmissions, and channel reporting are enabled during the temporal period while monitoring of the PDCCH is adjusted. The operations of 1720 may be performed according to the methods described herein. In some examples, aspects of the operations of 1720 may be performed by a monitoring component as described with reference to FIGS. 9 through 12.

Figure 18:
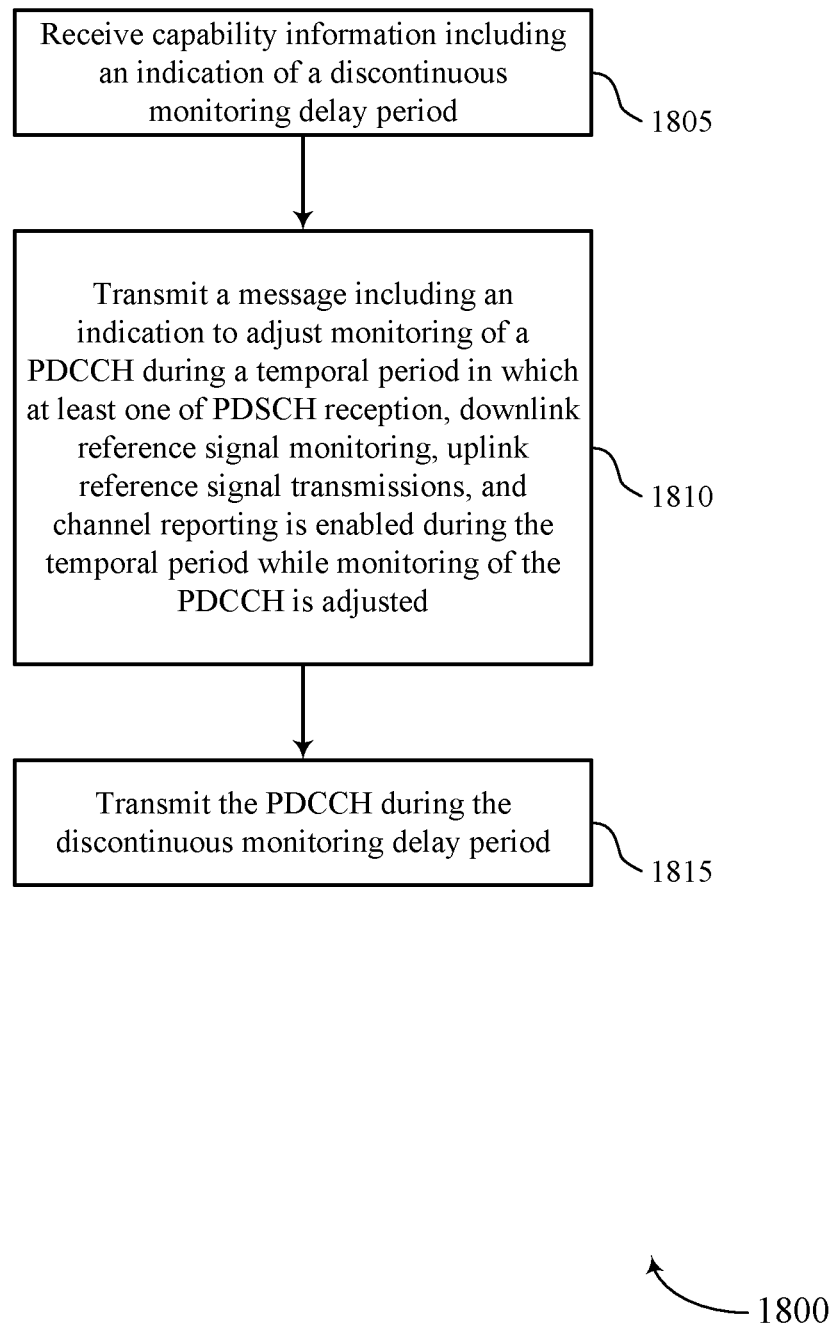

FIG. 18 shows a flowchart illustrating a method 1800 in accordance with aspects of the present disclosure. The operations of method 1800 may be implemented by a base station 105 or its components as described herein. For example, the operations of method 1800 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1805, the base station may receive capability information including an indication of a discontinuous monitoring delay period. The operations of 1805 may be performed according to the methods described herein. In some examples, aspects of the operations of 1805 may be performed by a capability component as described with reference to FIGS. 13 through 16.

At 1810, the base station may transmit a message including an indication to adjust monitoring of a PDCCH during a temporal period in which downlink reference signal monitoring, uplink reference signal transmissions, and channel reporting are enabled during the temporal period while monitoring of the PDCCH is adjusted. The operations of 1810 may be performed according to the methods described herein. In some examples, aspects of the operations of 1810 may be performed by a message component as described with reference to FIGS. 13 through 16.

At 1815, the base station may transmit the PDCCH during the discontinuous monitoring delay period. The operations of 1815 may be performed according to the methods described herein. In some examples, aspects of the operations of 1815 may be performed by a channel component as described with reference to FIGS. 13 through 16.

Figure 19:
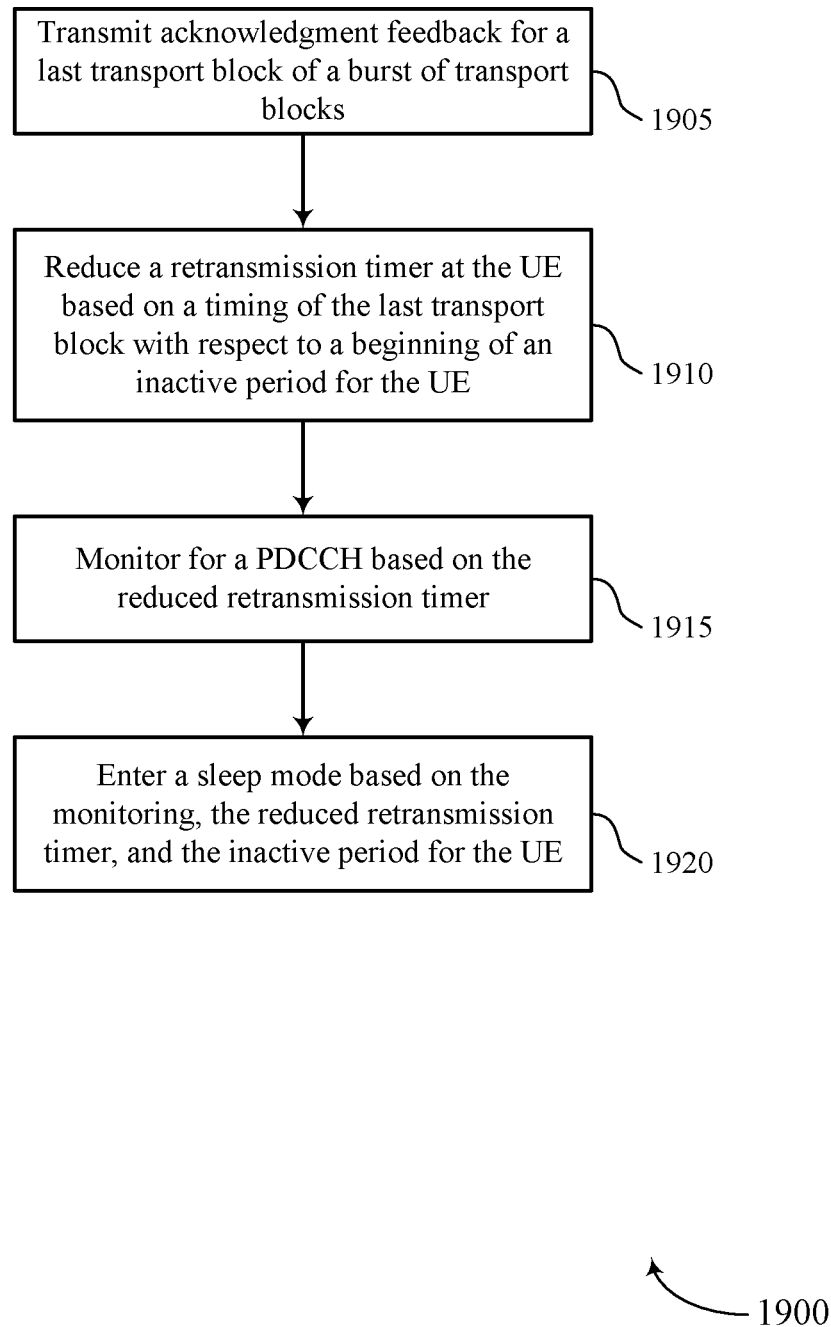

FIG. 19 shows a flowchart illustrating a method 1900 in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may transmit acknowledgment feedback for a last transport block of a burst of transport blocks. The operations of 1905 may be performed according to the methods described herein. In some examples, aspects of the operations of 1905 may be performed by a message component as described with reference to FIGS. 9 through 12.

At 1910, the UE may reduce a retransmission timer at the UE based on a timing of the last transport block with respect to a beginning of an inactive period for the UE. The operations of 1910 may be performed according to the methods described herein. In some examples, aspects of the operations of 1910 may be performed by a timer component as described with reference to FIGS. 9 through 12.

At 1915, the UE may monitor for a PDCCH based on the reduced retransmission timer. The operations of 1915 may be performed according to the methods described herein. In some examples, aspects of the operations of 1915 may be performed by a monitoring component as described with reference to FIGS. 9 through 12.

At 1920, the UE may enter a sleep mode based on the monitoring, the reduced retransmission timer, and the inactive period for the UE. The operations of 1920 may be performed according to the methods described herein. In some examples, aspects of the operations of 1920 may be performed by a mode component as described with reference to FIGS. 9 through 12.

Figure 20:
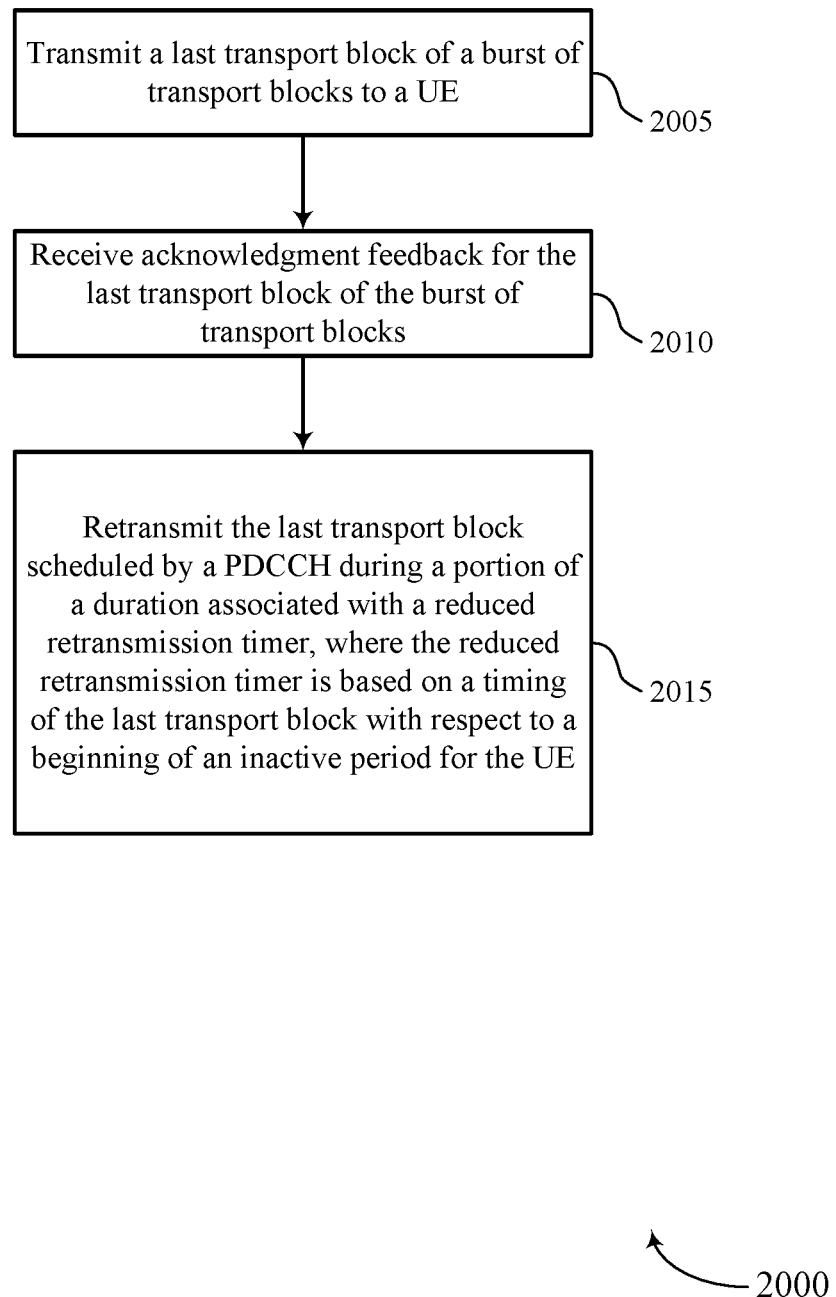

FIG. 20 shows a flowchart illustrating a method 2000 in accordance with aspects of the present disclosure. The operations of method 2000 may be implemented by a base station 105 or its components as described herein. For example, the operations of method 2000 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may transmit a last transport block of a burst of transport blocks to a UE. The operations of 2005 may be performed according to the methods described herein. In some examples, aspects of the operations of 2005 may be performed by a channel component as described with reference to FIGS. 13 through 16.

At 2010, the base station may receive acknowledgment feedback for the last transport block of the burst of transport blocks. The operations of 2010 may be performed according to the methods described herein. In some examples, aspects of the operations of 2010 may be performed by a feedback component as described with reference to FIGS. 13 through 16.

At 2015, the base station may retransmit the last transport block scheduled by a PDCCH during a portion of a duration associated with a reduced retransmission timer, where the reduced retransmission timer is based on a timing of the last transport block with respect to a beginning of an inactive period for the UE. The operations of 2015 may be performed according to the methods described herein. In some examples, aspects of the operations of 2015 may be performed by a channel component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: transmitting capability information including an indication of a discontinuous monitoring delay period; receiving a message comprising an indication to adjust monitoring of a PDCCH; monitoring for the PDCCH during the discontinuous monitoring delay period; and adjusting monitoring for the PDCCH following the discontinuous monitoring delay period during a temporal period based at least in part on the received indication to adjust monitoring of the PDCCH, wherein at least one of PDSCH reception, downlink reference signal monitoring, uplink reference signal transmissions, and channel reporting is enabled during the temporal period while monitoring of the PDCCH is adjusted.

Aspect 2: The method of aspect 1, wherein the discontinuous monitoring delay period comprises a duration between a first time associated with the received message and a second time associated with adjusting the monitoring of the PDCCH during an active portion of a DRX cycle.

Aspect 3: The method of any of aspects 1 through 2, wherein receiving the message comprises: receiving the indication to adjust monitoring of the PDCCH prior to the first transport block of a burst of transport blocks within an active portion of a DRX cycle.

Aspect 4: The method of any of aspects 1 through 3, wherein monitoring for the PDCCH during the discontinuous monitoring delay period comprises: performing blind decoding on the PDCCH until the delay period lapses.

Aspect 5: The method of aspect 4, wherein receiving the message corresponds to a decoding delay period and wherein the discontinuous monitoring delay period is greater than or equal to the decoding delay period, further comprising: refraining from performing blind decoding on the PDCCH in response to the discontinuous monitoring delay period lapsing.

Aspect 6: The method of any of aspects 1 through 5, wherein the message comprises an RRC message or a DCI message carried in the PDCCH.

Aspect 7: A method for wireless communications at a base station, comprising: receiving capability information including an indication of a discontinuous monitoring delay period; transmitting a message comprising an indication to adjust monitoring of a PDCCH during a temporal period in which at least one of PDSCH reception, downlink reference signal monitoring, uplink reference signal transmissions, and channel reporting is enabled during the temporal period while monitoring of the PDCCH is adjusted; and transmitting the PDCCH during the discontinuous monitoring delay period.

Aspect 8: The method of aspect 7, wherein the discontinuous monitoring delay period comprises a duration between a first time associated with reception of the transmitted message by the UE and a second time associated with adjusting the monitoring of the PDCCH by the UE.

Aspect 9: The method of any of aspects 7 through 8, wherein the message comprises an RRC message or a DCI message carried in the PDCCH, and wherein transmitting the message comprises: transmitting the indication to adjust monitoring of the PDCCH prior to the first transport block of a burst of transport blocks within an active portion of a DRX cycle.

Aspect 10: A method for wireless communications at a UE, comprising: transmitting acknowledgment feedback for a last transport block of a burst of transport blocks; reducing a retransmission timer at the UE based at least in part on a timing of the last transport block with respect to a beginning of an inactive period for the UE; monitoring for a PDCCH based at least in part on the reduced retransmission timer; and entering a sleep mode based at least in part on the monitoring, the reduced retransmission timer, and the inactive period for the UE.

Aspect 11: The method of aspect 10, further comprising: enabling the reduced retransmission timer over a DRX cycle.

Aspect 12: The method of any of aspects 10 through 11, further comprising: receiving a message comprising an indication of a value of the retransmission timer, wherein reducing the retransmission timer is based at least in part on the value of the retransmission timer in the received message.

Aspect 13: The method of aspect 12, further comprising: removing an offset from the value of the retransmission timer based at least in part on the received message, wherein reducing the retransmission timer is based at least in part on removing the offset from the value of the retransmission timer.

Aspect 14: The method of any of aspects 12 through 13, further comprising: applying a scaling factor to the value of the retransmission timer based at least in part on the received message, wherein reducing the retransmission timer is based at least in part on applying the scaling factor to the value of the retransmission timer.

Aspect 15: The method of any of aspects 12 through 14, wherein the message comprises an RRC message and a DCI message scheduling a PDSCH carrying the last transport block of the burst of transport blocks.

Aspect 16: The method of any of aspects 10 through 15, further comprising: monitoring the PDCCH while the retransmission timer is running.

Aspect 17: The method of aspect 16, further comprising: receiving a message comprising a bitmap identifying a set of candidate durations for monitoring the PDCCH for candidate retransmissions of the last transport block of the burst of transport blocks, wherein reducing the retransmission timer is based at least in part on the bitmap in the received message.

Aspect 18: The method of aspect 17, wherein monitoring the PDCCH comprises: monitoring for the PDCCH to receive the last transport block during a portion of a duration associated with the reduced retransmission timer.

Aspect 19: The method of any of aspects 10 through 18, further comprising: receiving a second PDCCH scheduling a retransmission of the last transport block of the burst of transport blocks during a portion of a duration associated with the reduced retransmission timer, wherein the portion is based at least in part on a relationship between a first time associated with the PDCCH scheduling the transmission of the last transport block and a second time of a transmission of the last transport block or a third time of the transmitted acknowledgment feedback for the last transport block; and receiving the retransmission of the last transport block of the burst of transport blocks.

Aspect 20: The method of any of aspects 10 through 19, wherein transmitting the acknowledgement feedback comprises: transmitting a HARQ feedback message based at least in part on receiving the burst of transport blocks during an active portion of a DRX cycle; and deactivating the reduced retransmission timer based at least in part on transmitting the HARQ feedback message.

Aspect 21: The method of any of aspects 10 through 20, wherein transmitting the acknowledgement feedback comprises: transmitting a positive HARQ feedback message based at least in part on receiving a retransmission of the last transport block of the burst of transport blocks during a portion of a duration associated with the reduced retransmission timer; and deactivating the reduced retransmission timer based at least in part on transmitting the HARQ feedback message.

Aspect 22: The method of any of aspects 10 through 21, further comprising: receiving a message comprising an indication to deactivate a group of search space sets associated with an active portion of a DRX cycle based at least in part on a grant for the last transport block of the burst of transport blocks; and deactivating the group of search space sets based at least in part on the received message.

Aspect 23: The method of any of aspects 10 through 22, wherein transmitting the acknowledgement feedback comprises: transmitting a negative HARQ feedback message for the last transport block of the burst of transport blocks based at least in part on the UE failing to receive the last transport block of the burst of transport blocks; and activating a group of search space sets associated with retransmission of the last transport block of the burst of transport blocks based at least in part on the transmitted negative HARQ feedback message, wherein the group of search space sets corresponds to an active portion of a DRX cycle.

Aspect 24: A method for wireless communications at a base station, comprising: transmitting a last transport block of a burst of transport blocks to a UE; receiving acknowledgment feedback for the last transport block of the burst of transport blocks; and retransmitting the last transport block scheduled by a PDCCH during a portion of a duration associated with a reduced retransmission timer, wherein the reduced retransmission timer is based at least in part on a timing of the last transport block with respect to a beginning of an inactive period for the UE.

Aspect 25: The method of aspect 24, further comprising: transmitting a message comprising an indication of a value of the retransmission timer, wherein the message comprises an RRC message and a DCI message scheduling the PDCCH carrying the last transport block of the burst of transport blocks.

Aspect 26: The method of any of aspects 24 through 25, further comprising: transmitting a message comprising a bitmap identifying a set of candidate durations for PDCCH scheduling candidate retransmissions of the last transport block of the burst of transport blocks.

Aspect 27: The method of any of aspects 24 through 26, wherein transmitting a second PDCCH scheduling a retransmission of the last transport block of the burst of transport blocks during a portion of a duration associated with the reduced retransmission timer, wherein retransmitting the last transport block comprises: transmitting the retransmission of the last transport block of the burst of transport blocks.

Aspect 28: The method of aspect 27, wherein the portion is based at least in part on a relationship between a first time associated with the transmitting PDCCH scheduling the transmission of the last transport block and a second time of a transmission of the last transport block or a third time of the transmitted acknowledgment feedback for the last transport block by the UE.

Aspect 29: The method of any of aspects 24 through 28, wherein receiving acknowledgment feedback comprises: receiving a HARQ feedback message based at least in part on retransmitting the last transport block during an active portion of a DRX cycle.

Aspect 30: The method of any of aspects 24 through 29, further comprising: allocating a grant for the last transport block of the burst of transport blocks; and transmitting a message comprising an indication to deactivate a group of search space sets associated with an active portion of a DRX cycle based at least in part on the grant for the last transport block of the burst of transport blocks.

Aspect 31: An apparatus for wireless communications at a UE, comprising a processor; memory coupled with the processor; and instructions stored in the memory and executable by the processor to cause the apparatus to perform a method of any of aspects 1 through 6.

Aspect 32: An apparatus for wireless communications at a UE, comprising at least one means for performing a method of any of aspects 1 through 6.

Aspect 33: A non-transitory computer-readable medium storing code for wireless communications at a UE, the code comprising instructions executable by a processor to perform a method of any of aspects 1 through 6.

Aspect 34: An apparatus for wireless communications at a base station, comprising a processor; memory coupled with the processor; and instructions stored in the memory and executable by the processor to cause the apparatus to perform a method of any of aspects 7 through 9.

Aspect 35: An apparatus for wireless communications at a base station, comprising at least one means for performing a method of any of aspects 7 through 9.

Aspect 36: A non-transitory computer-readable medium storing code for wireless communications at a base station, the code comprising instructions executable by a processor to perform a method of any of aspects 7 through 9.

Aspect 37: An apparatus for wireless communications at a UE, comprising a processor; memory coupled with the processor; and instructions stored in the memory and executable by the processor to cause the apparatus to perform a method of any of aspects 10 through 23.

Aspect 38: An apparatus for wireless communications at a UE, comprising at least one means for performing a method of any of aspects 10 through 23.

Aspect 39: A non-transitory computer-readable medium storing code for wireless communications at a UE, the code comprising instructions executable by a processor to perform a method of any of aspects 10 through 23.

Aspect 40: An apparatus for wireless communications at a base station, comprising a processor; memory coupled with the processor; and instructions stored in the memory and executable by the processor to cause the apparatus to perform a method of any of aspects 24 through 30.

Aspect 41: An apparatus for wireless communications at a base station, comprising at least one means for performing a method of any of aspects 24 through 30.

Aspect 42: A non-transitory computer-readable medium storing code for wireless communications at a base station, the code comprising instructions executable by a processor to perform a method of any of aspects 24 through 30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
one or more memories storing processor-executable code; and
one or more processors coupled with the one or more memories, wherein the one or more processors are individually or collectively configured to cause the UE to:
transmit acknowledgment feedback for a last transport block of a burst of transport blocks;
reduce a retransmission timer at the UE based at least in part on a timing of the last transport block with respect to a beginning of an inactive period for the UE;
monitor for a physical downlink control channel based at least in part on the reduced retransmission timer; and
enter a sleep mode based at least in part on the monitoring, the reduced retransmission timer, and the inactive period for the UE.

2. The apparatus of claim 1, wherein the one or more processors are individually or collectively further configured to cause the UE to:
enable the reduced retransmission timer over a discontinuous reception cycle.

3. The apparatus of claim 1, wherein the one or more processors are individually or collectively further configured to cause the UE to:
receive a message comprising an indication of a value of the retransmission timer, wherein reducing the retransmission timer is based at least in part on the value of the retransmission timer in the received message.

4. The apparatus of claim 3, wherein the one or more processors are individually or collectively further configured to cause the UE to:
remove an offset from the value of the retransmission timer based at least in part on the received message, wherein reducing the retransmission timer is based at least in part on removing the offset from the value of the retransmission timer.

5. The apparatus of claim 3, wherein the one or more processors are individually or collectively further configured to cause the UE to:
apply a scaling factor to the value of the retransmission timer based at least in part on the received message, wherein reducing the retransmission timer is based at least in part on applying the scaling factor to the value of the retransmission timer.

6. The apparatus of claim 3, wherein the message comprises a radio resource control message and a downlink control information message scheduling a physical downlink shared channel carrying the last transport block of the burst of transport blocks.

7. The apparatus of claim 1, wherein the one or more processors are individually or collectively further configured to cause the UE to:
monitor the physical downlink control channel while the retransmission timer is running.

8. The apparatus of claim 7, wherein the one or more processors are individually or collectively further configured to cause the UE to:
receive a message comprising a bitmap identifying a set of candidate durations for monitoring the physical downlink control channel for candidate retransmissions of the last transport block of the burst of transport blocks, wherein reducing the retransmission timer is based at least in part on the bitmap in the received message.

9. The apparatus of claim 8, wherein, to monitor the physical downlink control channel, the one or more processors are individually or collectively further configured to cause the UE to:
monitor for the physical downlink control channel to receive the last transport block during a portion of a duration associated with the reduced retransmission timer.

10. The apparatus of claim 1, wherein the one or more processors are individually or collectively further configured to cause the UE to:
receive a second physical downlink control channel scheduling a retransmission of the last transport block of the burst of transport blocks during a portion of a duration associated with the reduced retransmission timer, wherein the portion is based at least in part on a relationship between a first time associated with the physical downlink control channel scheduling the last transport block and a second time of a transmission of the last transport block or a third time of the transmitted acknowledgment feedback for the last transport block; and
receive the retransmission of the last transport block of the burst of transport blocks.

11. The apparatus of claim 1, wherein, to transmit the acknowledgement feedback, the one or more processors are individually or collectively further configured to cause the UE to:
transmit a hybrid automatic repeat request feedback message based at least in part on receiving the burst of transport blocks during an active portion of a discontinuous reception cycle; and
deactivate the reduced retransmission timer based at least in part on transmitting the hybrid automatic repeat request feedback message.

12. The apparatus of claim 1, wherein, to transmit the acknowledgement feedback, the one or more processors are individually or collectively further configured to cause the UE to:
transmit a positive hybrid automatic repeat request feedback message based at least in part on receiving a retransmission of the last transport block of the burst of transport blocks during a portion of a duration associated with the reduced retransmission timer; and
deactivate the reduced retransmission timer based at least in part on transmitting the hybrid automatic repeat request feedback message.

13. The apparatus of claim 1, wherein the one or more processors are individually or collectively further configured to cause the UE to:
receive a message comprising an indication to deactivate a group of search space sets associated with an active portion of a discontinuous reception cycle based at least in part on a grant for the last transport block of the burst of transport blocks; and deactivate the group of search space sets based at least in part on the received message.

14. The apparatus of claim 1, wherein the one or more processors are individually or collectively further configured to cause the UE to:

transmit a negative hybrid automatic repeat request feedback message for the last transport block of the burst of transport blocks based at least in part on the UE failing to receive the last transport block of the burst of transport blocks; and activate a group of search space sets associated with retransmission of the last transport block of the burst of transport blocks based at least in part on the transmitted negative hybrid automatic repeat request feedback message, wherein the group of search space sets corresponds to an active portion of a discontinuous reception cycle.

15. An apparatus for wireless communications at a network entity, comprising:

one or more memories storing processor-executable code; and one or more processors coupled with the one or more memories, wherein the one or more processors are individually or collectively configured to cause the network entity to:

transmit a last transport block of a burst of transport blocks to a user equipment (UE);

receive acknowledgment feedback for the last transport block of the burst of transport blocks; and retransmit the last transport block scheduled by a physical downlink control channel during a portion of a duration associated with a reduced retransmission timer, wherein the reduced retransmission timer is based at least in part on a timing of the last transport block with respect to a beginning of an inactive period for the UE.

16. The apparatus of claim 15, wherein the one or more processors are individually or collectively further configured to cause the network entity to:

transmit a message comprising an indication of a value of the retransmission timer, wherein the message comprises a radio resource control message and a downlink control information message scheduling the physical downlink control channel carrying the last transport block of the burst of transport blocks.

17. The apparatus of claim 15, wherein the one or more processors are individually or collectively further configured to cause the network entity to:

transmit a message comprising a bitmap identifying a set of candidate durations for physical downlink control channel scheduling candidate retransmissions of the last transport block of the burst of transport blocks.

18. The apparatus of claim 15, wherein, to retransmit the last transport block, the one or more processors are individually or collectively further configured to cause the network entity to:

transmit the retransmission of the last transport block of the burst of transport blocks.

19. The apparatus of claim 18, wherein the portion is based at least in part on a relationship between a first time associated with the transmitting physical downlink control channel scheduling the last transport block and a second time of a transmission of the last transport block or a third time of the transmitted acknowledgment feedback for the last transport block by the UE.

20. The apparatus of claim 15, wherein, to receive acknowledgment feedback, the one or more processors are individually or collectively further configured to cause the network entity to:

receive a hybrid automatic repeat request feedback message based at least in part on retransmitting the last transport block during an active portion of a discontinuous reception cycle.

21. The apparatus of claim 15, wherein the one or more processors are individually or collectively further configured to cause the network entity to:

allocate a grant for the last transport block of the burst of transport blocks; and transmit a message comprising an indication to deactivate a group of search space sets associated with an active portion of a discontinuous reception cycle based at least in part on the grant for the last transport block of the burst of transport blocks.

22. A method for wireless communication at a user equipment (UE), comprising:

transmitting acknowledgment feedback for a last transport block of a burst of transport blocks;

reducing a retransmission timer at the UE based at least in part on a timing of the last transport block with respect to a beginning of an inactive period for the UE;

monitoring for a physical downlink control channel based at least in part on the reduced retransmission timer; and entering a sleep mode based at least in part on the monitoring, the reduced retransmission timer, and the inactive period for the UE.

23. The method of claim 22, further comprising:

enabling the reduced retransmission timer over a discontinuous reception cycle.

24. The method of claim 22, further comprising:

receiving a message comprising an indication of a value of the retransmission timer, wherein reducing the retransmission timer is based at least in part on the value of the retransmission timer in the received message.

25. The method of claim 22, further comprising:

monitoring the physical downlink control channel while the retransmission timer is running.

26. The method of claim 22, further comprising:

receiving a second physical downlink control channel scheduling a retransmission of the last transport block of the burst of transport blocks during a portion of a duration associated with the reduced retransmission timer, wherein the portion is based at least in part on a relationship between a first time associated with the physical downlink control channel scheduling the last transport block and a second time of a transmission of the last transport block or a third time of the transmitted acknowledgment feedback for the last transport block; and receive the retransmission of the last transport block of the burst of transport blocks.

27. The method of claim 22, transmitting the acknowledgement feedback comprises:

transmitting a hybrid automatic repeat request feedback message based at least in part on receiving the burst of transport blocks during an active portion of a discontinuous reception cycle; and deactivating the reduced retransmission timer based at least in part on transmitting the hybrid automatic repeat request feedback message.

28. The method of claim 22, wherein, to transmitting the acknowledgement feedback comprises:
- transmitting a positive hybrid automatic repeat request feedback message based at least in part on receiving a retransmission of the last transport block of the burst of transport blocks during a portion of a duration associated with the reduced retransmission timer; and
- deactivating the reduced retransmission timer based at least in part on transmitting the hybrid automatic repeat request feedback message.

29. The method of claim 22, further comprising:
- receiving a message comprising an indication to deactivate a group of search space sets associated with an active portion of a discontinuous reception cycle based at least in part on a grant for the last transport block of the burst of transport blocks; and
- deactivating the group of search space sets based at least in part on the received message.

30. The method of claim 22, further comprising:
- transmitting a negative hybrid automatic repeat request feedback message for the last transport block of the burst of transport blocks based at least in part on the UE failing to receive the last transport block of the burst of transport blocks; and
- activating a group of search space sets associated with retransmission of the last transport block of the burst of transport blocks based at least in part on the transmitted negative hybrid automatic repeat request feedback message, wherein the group of search space sets corresponds to an active portion of a discontinuous reception cycle.

* * * * *